US008959802B2

(12) United States Patent
Hatfield et al.

(10) Patent No.: US 8,959,802 B2
(45) Date of Patent: Feb. 24, 2015

(54) ARTICLE OF FOOTWEAR WITH A STRETCHABLE UPPER AND AN ARTICULATED SOLE STRUCTURE

(75) Inventors: Tobie D. Hatfield, Lake Oswego, OR (US); Eric P. Avar, Aloha, OR (US); Jeffrey C. Pisciotta, Oregon City, OR (US); James Meschter, Portland, OR (US); Kevin Hoffer, Portland, OR (US); Stann Norman Richard Sheperd, Santa Cruz, CA (US); Todd Anthony Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/613,096

(22) Filed: Sep. 13, 2012

(65) Prior Publication Data

US 2013/0000159 A1      Jan. 3, 2013

Related U.S. Application Data

(63) Continuation of application No. 11/222,508, filed on Sep. 8, 2005, now Pat. No. 8,303,885, which is a continuation-in-part of application No. 10/681,321, filed on Oct. 9, 2003, now Pat. No. 6,990,755.

(51) Int. Cl.
*A43B 3/26* (2006.01)
*A43B 7/06* (2006.01)
(Continued)

(52) U.S. Cl.
CPC ............... *A43B 7/06* (2013.01); *A43B 3/0057* (2013.01); *A43B 13/141* (2013.01); *A43B 13/16* (2013.01); *A43B 23/00* (2013.01); *B29D 35/122* (2013.01);
(Continued)

(58) Field of Classification Search
USPC ............................................................ 36/97
See application file for complete search history.

(56) References Cited

U.S. PATENT DOCUMENTS

| D16,018 S | 4/1885 | Elliott |
|---|---|---|
| D16,757 S | 6/1886 | Cowen |

(Continued)

FOREIGN PATENT DOCUMENTS

| BE | 357280 | 1/1929 |
|---|---|---|
| BE | 493654 | 6/1950 |

(Continued)

OTHER PUBLICATIONS

Patent Examination Report No. 2 in AU2011200925 dated May 1, 2013.
(Continued)

*Primary Examiner* — Larry Thrower
(74) *Attorney, Agent, or Firm* — Banner & Witcoff, Ltd.

(57) ABSTRACT

An article of footwear is disclosed that includes at least one of a stretchable upper and an articulated sole structure. The upper may include an exterior layer and an interior layer. The exterior layer forms at least a portion of an exterior of the upper, and the exterior layer includes a plurality of incisions that extend through the exterior layer. The interior layer is located adjacent an inner surface of the exterior layer, and the interior layer is exposed through the incisions. The sole structure may include a connecting portion and a plurality of discrete sole elements. The connecting portion is positioned adjacent the upper and may extend along a longitudinal length of the upper. The sole elements extend from the connecting portion, and the sole elements are separated by a plurality of sipes that extend upward into the sole structure.

12 Claims, 16 Drawing Sheets

(51) Int. Cl.
    *A43B 3/00*         (2006.01)
    *A43B 13/14*       (2006.01)
    *A43B 13/16*       (2006.01)
    *A43B 23/00*       (2006.01)
    *B29D 35/12*       (2010.01)
    *A43B 23/02*       (2006.01)
    *A43B 23/08*       (2006.01)
    *A43B 23/17*       (2006.01)

(52) U.S. Cl.
    CPC ......... *A43B 23/0205* (2013.01); *A43B 23/0235* (2013.01); *A43B 23/025* (2013.01); *A43B 23/0255* (2013.01); *A43B 23/027* (2013.01); *A43B 23/088* (2013.01); *A43B 23/17* (2013.01)
    USPC .......................................................... 36/97

(56) References Cited

U.S. PATENT DOCUMENTS

| | | | |
|---|---|---|---|
| 354,693 A | 12/1886 | Dick | |
| 500,385 A | 6/1893 | Hall | |
| D39,747 S | 1/1909 | McKenna | |
| 997,657 A | 7/1911 | Drake | |
| 1,111,437 A | 9/1914 | Butterfield | |
| D46,568 S | 10/1914 | Hopwood | |
| 1,219,507 A | 3/1917 | Teare | |
| 1,387,411 A | 8/1921 | Kolkebeck | |
| D79,934 S | 11/1929 | Paterson | |
| D80,361 S | 1/1930 | Crowley | |
| 1,808,063 A | 6/1931 | Paterson | |
| D90,057 S | 5/1933 | Van Cleef | |
| 1,936,729 A | 11/1933 | Mebane | |
| 2,155,166 A | 4/1939 | Kraft | |
| 2,156,166 A | 4/1939 | Smith | |
| 2,162,912 A | 6/1939 | Craver | |
| D115,636 S | 7/1939 | Sperry | |
| 2,188,168 A | 1/1940 | Winkel | |
| 2,224,590 A | 12/1940 | Boivin | |
| 2,229,406 A | 1/1941 | Cutler | |
| D125,431 S | 2/1941 | Starner | |
| 2,370,301 A | 2/1945 | Ghez et al. | |
| 2,433,329 A | 12/1947 | Adler et al. | |
| 2,747,302 A | 5/1956 | Heislerkamp | |
| 3,019,534 A | 2/1962 | Kauffman et al. | |
| 3,043,025 A | 7/1962 | Semon | |
| 3,087,261 A | 4/1963 | Russell | |
| D196,491 S | 10/1963 | Papoutsy | |
| D197,505 S | 2/1964 | Bingham, Jr. et al. | |
| D200,846 S | 4/1965 | Bovay | |
| D201,864 S | 8/1965 | Smith, III | |
| 3,295,230 A | 1/1967 | Szerenyi et al. | |
| 3,373,510 A | 3/1968 | Memole et al. | |
| 3,538,628 A | 11/1970 | Einstein, Jr. | |
| 3,662,478 A | 5/1972 | Schwab | |
| 3,846,919 A | 11/1974 | Milotic | |
| 4,059,910 A | 11/1977 | Bryden et al. | |
| 4,063,371 A | 12/1977 | Batra | |
| 4,118,878 A | 10/1978 | Semon | |
| 4,241,524 A | 12/1980 | Sink | |
| 4,245,406 A | 1/1981 | Landay et al. | |
| 4,265,032 A | 5/1981 | Levine | |
| 4,267,650 A | 5/1981 | Bauer | |
| 4,302,892 A | 12/1981 | Adamik | |
| 4,309,831 A * | 1/1982 | Pritt ........................... 36/3 B | |
| 4,309,832 A | 1/1982 | Hunt | |
| 4,378,643 A | 4/1983 | Johnson | |
| 4,393,605 A | 7/1983 | Spreng | |
| 4,420,894 A | 12/1983 | Glassman | |
| 4,439,937 A | 4/1984 | Daswick | |
| 4,454,662 A | 6/1984 | Stubblefield | |
| D278,851 S | 5/1985 | Austin | |
| 4,538,368 A | 9/1985 | Mugford | |
| 4,281,459 S | 11/1985 | Parker | |
| 4,562,651 A | 1/1986 | Frederick et al. | |
| 4,617,745 A | 10/1986 | Batra | |
| 4,631,842 A | 12/1986 | Koskela | |
| 4,638,577 A | 1/1987 | Riggs | |
| D288,027 S | 2/1987 | Tonkel | |
| 4,658,514 A | 4/1987 | Shin | |
| D294,537 S | 3/1988 | Le | |
| D294,653 S | 3/1988 | Le | |
| 4,741,114 A | 5/1988 | Stubblefield | |
| 4,745,693 A | 5/1988 | Brown | |
| 4,747,220 A | 5/1988 | Autry et al. | |
| D301,184 S | 5/1989 | Hase | |
| 4,825,563 A | 5/1989 | Strongwater | |
| D302,352 S | 7/1989 | Austin | |
| 4,850,122 A | 7/1989 | Schwab, Jr. | |
| D302,765 S | 8/1989 | Esser | |
| 4,854,057 A | 8/1989 | Misevich et al. | |
| 4,887,369 A | 12/1989 | Bailey et al. | |
| 4,897,936 A | 2/1990 | Fuerst | |
| 4,908,964 A | 3/1990 | Deem | |
| 4,910,887 A | 3/1990 | Turner et al. | |
| D307,816 S | 5/1990 | Schneider | |
| D307,817 S | 5/1990 | Schneider | |
| 4,936,028 A | 6/1990 | Posacki | |
| 4,974,344 A | 12/1990 | Ching | |
| D316,627 S | 5/1991 | Schneider | |
| 5,012,597 A | 5/1991 | Thomasson | |
| 5,083,385 A | 1/1992 | Halford | |
| D332,863 S | 2/1993 | Lucas | |
| D337,876 S | 8/1993 | Kilbey | |
| 5,367,791 A | 11/1994 | Gross et al. | |
| 5,381,610 A | 1/1995 | Hanson | |
| 5,384,973 A | 1/1995 | Lyden | |
| 5,410,821 A | 5/1995 | Hilgendorf | |
| 5,425,184 A | 6/1995 | Lyden et al. | |
| 5,528,842 A | 6/1996 | Ricci et al. | |
| 5,533,280 A | 7/1996 | Halliday | |
| D377,859 S | 2/1997 | Bramani | |
| D378,472 S | 3/1997 | Bramani | |
| 5,625,964 A | 5/1997 | Lyden et al. | |
| 5,647,145 A | 7/1997 | Russell et al. | |
| 5,661,915 A | 9/1997 | Smith | |
| 5,676,295 A | 10/1997 | Gelb | |
| D388,594 S | 1/1998 | Turner et al. | |
| 5,720,117 A | 2/1998 | Toschi | |
| D394,342 S | 5/1998 | Schneider | |
| 5,784,808 A | 7/1998 | Hockerson | |
| 5,799,417 A | 9/1998 | Burke et al. | |
| 5,822,888 A | 10/1998 | Terry | |
| D409,362 S | 5/1999 | Turner et al. | |
| 5,915,820 A | 6/1999 | Kraeuter et al. | |
| D414,317 S | 9/1999 | Lubart | |
| 5,991,950 A | 11/1999 | Schenkel | |
| 6,023,857 A | 2/2000 | Vizy et al. | |
| 6,023,859 A | 2/2000 | Burke et al. | |
| D421,832 S | 3/2000 | Loveder | |
| 6,041,525 A | 3/2000 | Kelley | |
| 6,055,746 A | 5/2000 | Lyden et al. | |
| 6,065,230 A | 5/2000 | James | |
| 6,076,283 A | 6/2000 | Boie | |
| 6,079,126 A | 6/2000 | Olszewski | |
| D427,758 S | 7/2000 | Schneider | |
| 6,108,943 A | 8/2000 | Hudson et al. | |
| 6,115,945 A * | 9/2000 | Ellis, III ........................ 36/102 |
| D433,792 S | 11/2000 | Cockrell | |
| 6,145,221 A | 11/2000 | Hockerson | |
| 6,161,315 A | 12/2000 | Dalton | |
| D439,394 S | 3/2001 | Akhidime | |
| 6,202,325 B1 | 3/2001 | Kim | |
| D446,915 S | 8/2001 | Cockrell | |
| D446,916 S | 8/2001 | Cockrell | |
| D447,326 S | 9/2001 | Cockrell | |
| 6,393,732 B1 | 5/2002 | Kita | |
| 6,446,359 B2 | 9/2002 | Tomat | |
| 6,449,878 B1 | 9/2002 | Lyden | |
| D463,901 S | 10/2002 | Adams et al. | |
| 6,477,791 B2 | 11/2002 | Luthi et al. | |
| 6,481,121 B1 | 11/2002 | Tucker | |
| 6,487,795 B1 | 12/2002 | Ellis, III | |
| D468,079 S | 1/2003 | DeGrand et al. | |

(56) References Cited

U.S. PATENT DOCUMENTS

| | | |
|---|---|---|
| D469,949 S | 2/2003 | Koo |
| 6,519,875 B1 | 2/2003 | Beard |
| 6,574,889 B2 | 6/2003 | Cagner |
| 6,581,303 B1 | 6/2003 | Tuan |
| 6,601,042 B1 | 7/2003 | Lyden |
| D483,934 S | 12/2003 | Adams et al. |
| D492,095 S | 6/2004 | Sanchez et al. |
| 6,775,930 B2 | 8/2004 | Fuerst |
| 6,782,642 B2 | 8/2004 | Knoche et al. |
| D507,172 S | 7/2005 | Van Tichelt |
| 6,915,596 B2 | 7/2005 | Grove et al. |
| D509,650 S | 9/2005 | Burg |
| D509,949 S | 9/2005 | Wu |
| D509,950 S | 9/2005 | Adams et al. |
| D511,881 S | 11/2005 | Cockrell |
| 6,990,755 B2 | 1/2006 | Hatfield et al. |
| D514,287 S | 2/2006 | Cockrell |
| 7,016,867 B2 | 3/2006 | Lyden |
| D519,265 S | 4/2006 | Gerber |
| 7,076,890 B2 | 7/2006 | Grove et al. |
| D527,172 S | 8/2006 | Burg |
| 7,107,235 B2 | 9/2006 | Lyden |
| D529,694 S | 10/2006 | Cockrell |
| D529,695 S | 10/2006 | Cockrell |
| D529,696 S | 10/2006 | Cockrell |
| D530,067 S | 10/2006 | Cockrell |
| D530,894 S | 10/2006 | Cockrell |
| D530,895 S | 10/2006 | Cockrell |
| D531,788 S | 11/2006 | Rittberg |
| D532,585 S | 11/2006 | McDonald |
| 7,168,190 B1 | 1/2007 | Gillespie |
| D536,517 S | 2/2007 | Gerber |
| 7,171,767 B2 | 2/2007 | Hatfield et al. |
| D543,340 S | 5/2007 | Favreau et al. |
| D545,036 S | 6/2007 | Roulo |
| D548,439 S | 8/2007 | McClaskie |
| D549,941 S | 9/2007 | Dirsa |
| D553,835 S | 10/2007 | McClaskie |
| 7,287,342 B2 | 10/2007 | Keen |
| D554,339 S | 11/2007 | Reina et al. |
| 7,290,357 B2 | 11/2007 | McDonald et al. |
| D562,541 S | 2/2008 | Avar |
| 7,331,123 B2 | 2/2008 | Workman et al. |
| D564,191 S | 3/2008 | Jensen |
| 7,392,605 B2 | 7/2008 | Hatfield et al. |
| D580,139 S | 11/2008 | McClaskie |
| 7,444,763 B2 | 11/2008 | Grove et al. |
| 7,451,557 B2 | 11/2008 | McDonald et al. |
| 7,607,241 B2 | 10/2009 | McDonald et al. |
| 7,946,058 B2 | 5/2011 | Johnson et al. |
| 7,954,261 B2 | 6/2011 | Shakoor et al. |
| 2001/0025432 A1 | 10/2001 | Contreras et al. |
| 2003/0046830 A1 | 3/2003 | Ellis, III |
| 2003/0051372 A1 | 3/2003 | Lyden |
| 2003/0069807 A1 | 4/2003 | Lyden |
| 2005/0076536 A1* | 4/2005 | Hatfield et al. ............... 36/3 B |
| 2005/0262739 A1 | 12/2005 | McDonald et al. |
| 2005/0268491 A1 | 12/2005 | McDonald et al. |
| 2006/0061012 A1 | 3/2006 | Hatfield et al. |
| 2007/0169376 A1 | 7/2007 | Hatfield et al. |
| 2008/0229617 A1 | 9/2008 | Johnson et al. |
| 2009/0126230 A1 | 5/2009 | McDonald et al. |
| 2009/0293314 A1 | 12/2009 | Dekovic et al. |
| 2010/0299965 A1 | 12/2010 | Avar et al. |
| 2011/0094125 A1 | 4/2011 | Weightman |

FOREIGN PATENT DOCUMENTS

| | | |
|---|---|---|
| DE | 3741444 | 7/1988 |
| DE | 9208153 | 12/1992 |
| DE | 29602610 | 5/1996 |
| DE | 29919124.9 | 11/1999 |
| EP | 0965281 | 12/1999 |
| EP | 1002475 | 5/2000 |
| EP | 1832191 | 9/2007 |
| EP | 2298104 | 3/2011 |
| FR | 2813766 | 3/2002 |
| GB | 471179 | 8/1937 |
| GB | 1518866 | 7/1978 |
| GB | 2340378 | 2/2000 |
| GB | 2431857 | 5/2007 |
| JP | 60182804 | 12/1985 |
| JP | 61500474 | 3/1986 |
| JP | 02126801 | 5/1990 |
| JP | 05228001 | 9/1993 |
| JP | 08-280406 | 10/1996 |
| JP | 3066110 | 11/1999 |
| JP | 3040984 | 5/2000 |
| JP | 2000-201704 | 7/2000 |
| JP | 2004267407 | 9/2004 |
| WO | 8808677 | 11/1988 |
| WO | 9103180 | 3/1991 |
| WO | 9105491 | 5/1991 |
| WO | 9111924 | 8/1991 |
| WO | 9119429 | 12/1991 |
| WO | 9207483 | 5/1992 |
| WO | 9403080 | 2/1994 |
| WO | 97/46127 A1 | 12/1997 |
| WO | 9746127 | 12/1997 |
| WO | 03053664 | 7/2003 |
| WO | 2004066771 | 8/2004 |
| WO | 2004103105 | 12/2004 |

OTHER PUBLICATIONS

English translation of Decision of Rejection in CN200810085559.3 dated Apr. 3, 2013.
English translation of Search Report for CN2008100855593 dated Mar. 25, 2013.
Patent Examination Report No. 1 in AU2013200607 dated Jun. 21, 2013.
Communication in EP10178539.2 dated Apr. 25, 2013.
First Examination Report in AU2013200600 dated May 23, 2013.
Patent Examination Report No. 1 in AU2013200599 dated May 23, 2013.
Patent Examination Report No. 3 in AU2011200925 dated Sep. 17, 2013.
Notification of Reasons for Refusal with English Translation in JP2011-091419 dated Feb. 1, 2013.
Communication in EP06739847.9-1265 dated Oct. 15, 2012.
Communication in EP10178541.8 dated Jan. 24, 2013.
Fifth Office Action in CN200810085559.3 dated Sep. 24, 2012, with English translation.
Second Office Action in CN201010219133X dated Jul. 30, 2012 with English Translation.
Patent Examination Report No. 1 in AU2013200601 dated May 10, 2013.
Official Communication in EP 06 790 137.1-2318 dated Jun. 18, 2010.
Partial International Search Report in related PCT Application, International Application No. PCT/US2006/034211, mailed Jan. 11, 2007.
Preliminary Report on Patentability/Written Opinion in corresponding PCT Application No. PCT/US2006/034211, mailed on Mar. 20, 2008.
European Search Report in corresponding European Application, Application No. 07025158.2, dated Apr. 15, 2008.
Communication relating to the results of the Partial International Search, in corresponding PCT Application, application No. PCT/US2004/033111, mailed Feb. 25, 2005 (6 pages).
ESR in EP10178534 dated Feb. 22, 2011.
ESR in EP10178539.2 dated Feb. 22, 2011.
ESR in EP10178540 dated Feb. 24, 2011.
ESR in EP10178544 dated Feb. 22, 2011.
ESR in EP10178541 dated Feb. 22, 2011.
ISR in PCT/US2006/011321 dated Nov. 24, 2006.
Office Action in EP06739847 dated Nov. 25, 2010.
First Office Action in CN2006800151950 dated Apr. 24, 2009.
Second Office Action in CN2006800151950 dated Jan. 29, 2010.

(56) References Cited

OTHER PUBLICATIONS

Notice of Reasons for Rejection with English Translation in JP2008-504259 dated Sep. 15, 2010.
ISR in PCT/US2006/034211 dated Dec. 18, 2006.
First Office Action in CN200680039167.2 dated Nov. 27, 2009 with English Translation.
Communication in EP05757186.1-2313 dated May 14, 2007.
Written Opinion in PCT/US2005/019897 dated Sep. 29, 2005.
Communication in EP04794454.1 dated Aug. 9, 2006.
Communication in EP04794454.1 dated Aug. 9, 2007.
Communication in EP04794454.1 dated Dec. 5, 2008.
Communication in EP04794454.1 dated Apr. 19, 2010.
ESR in EP07025158 dated Apr. 15, 2008.
Communication in EP07025158.2-2318 dated Nov. 21, 2008.
Office Action in CA2540975 dated Nov. 26, 2007.
First Office Action in CN200480034430.X dated Aug. 24, 2007 with English Translation.
First Office Action in CN2008100855593 dated Jun. 19, 2009 with English translation.
Second Office Action in CN2008100855593 dated Apr. 8, 2010 with English Translation.
Third Office Action in CN2008100855593 dated Jan. 12, 2011 with English translation.
Examiners First Report in AU2004279433 dated Dec. 10, 2007.
Examiners First Report in AU2008202195 dated Nov. 30, 2009.
Examiners First Report in AU2008202224 dated May 13, 2009.
ISR & WO from PCT/US2004/033111 dated Apr. 20, 2005.
ISR & WO from PCT/US2005/019897 dated Sep. 16, 2005.
IPRP from PCT/US2005/019897 dated Dec. 4, 2006.
Notification of Reason(s) for Refusal in JP2006-534338 dated Jan. 30, 2009.
Notification of Reason(s) for Refusal in JP2006-534338 dated Jan. 26, 2010.
Official Letter in TW Application No. 93130352, dated Jan. 19, 2010.
Official Letter in TW Application No. 93130352, dated Nov. 26, 2010.
International Search Report and Written Opinion for PCT/US2009/042309, dated Aug. 10, 2009.
First Office Action in CN201010219133X dated Nov. 9, 2011 with English Translation.
Official Letter in TW Patent Application No. 93130352 dated on or before Oct. 18, 2011.
Official Letter in TW Patent Application No. 100117955 dated on or before Oct. 18, 2011.
Official Letter in TW Patent Application No. 100117956 dated on or before Oct. 18, 2011.
Official Letter in TW Patent Application No. 100117957 dated on or before Oct. 25, 2011.
Notification of Reasons for Refusal with English translation in JP2009-176817 dated Feb. 6, 2012.
The Fourth Office Action in CN200810085559.3 dated Feb. 6, 2012.
Examiner's First Report in AU2011200925 dated Feb. 16, 2012.

\* cited by examiner

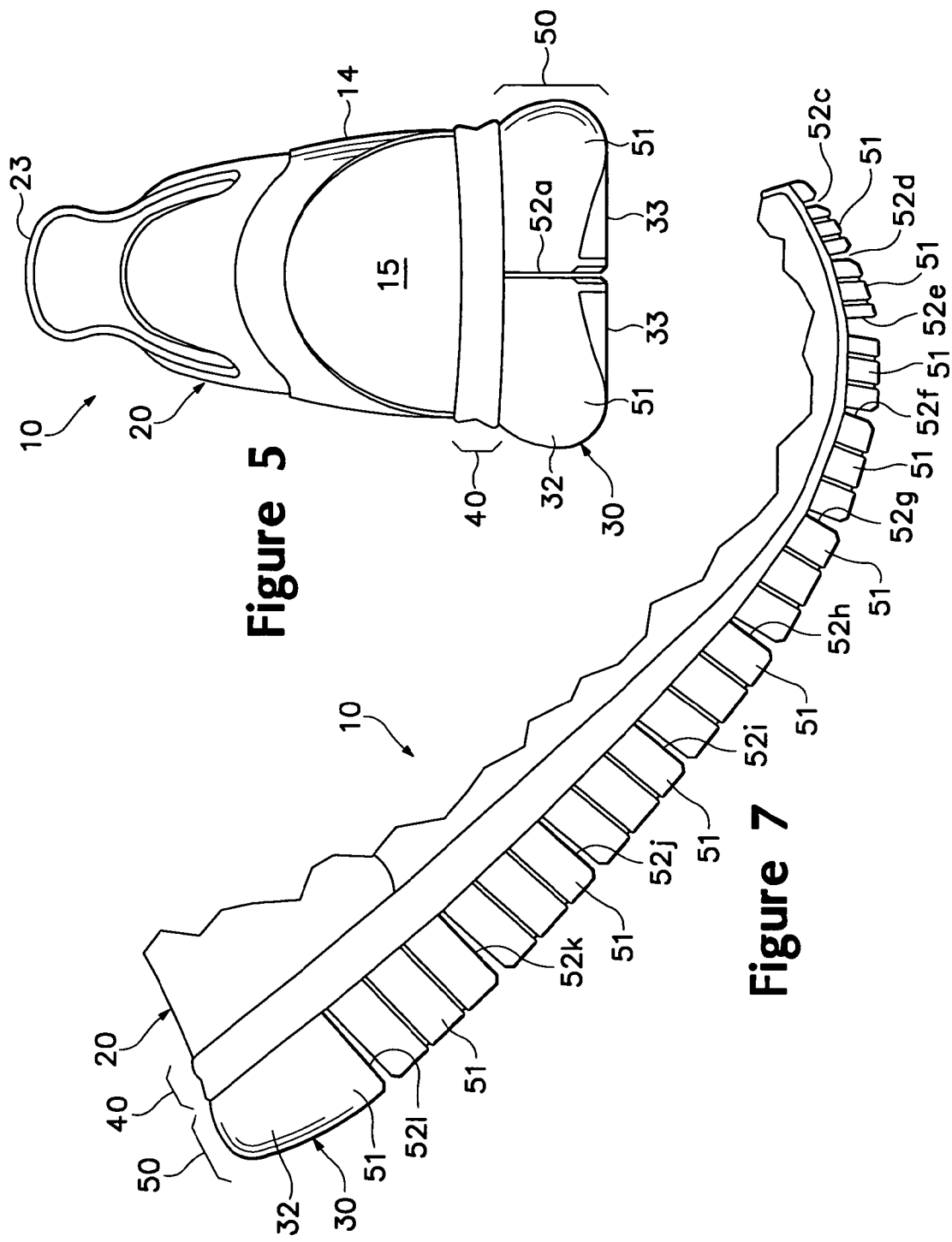

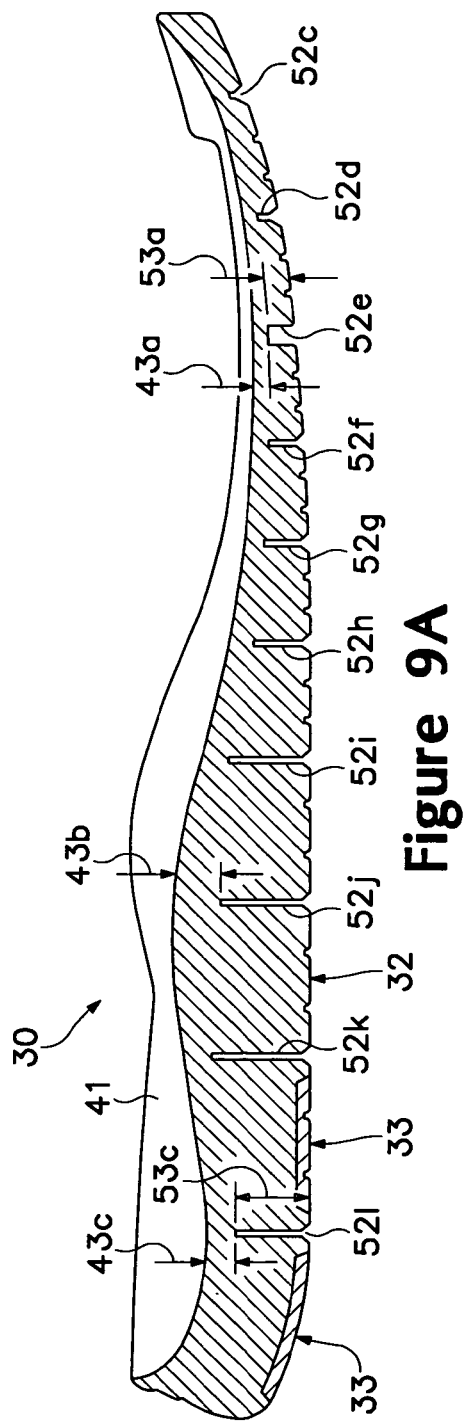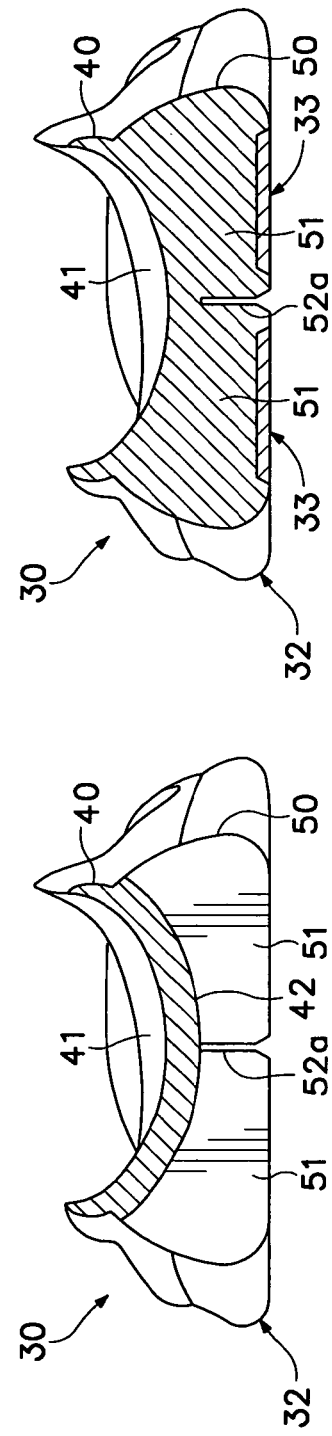

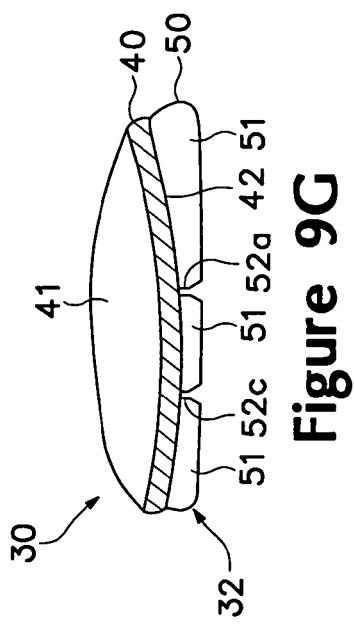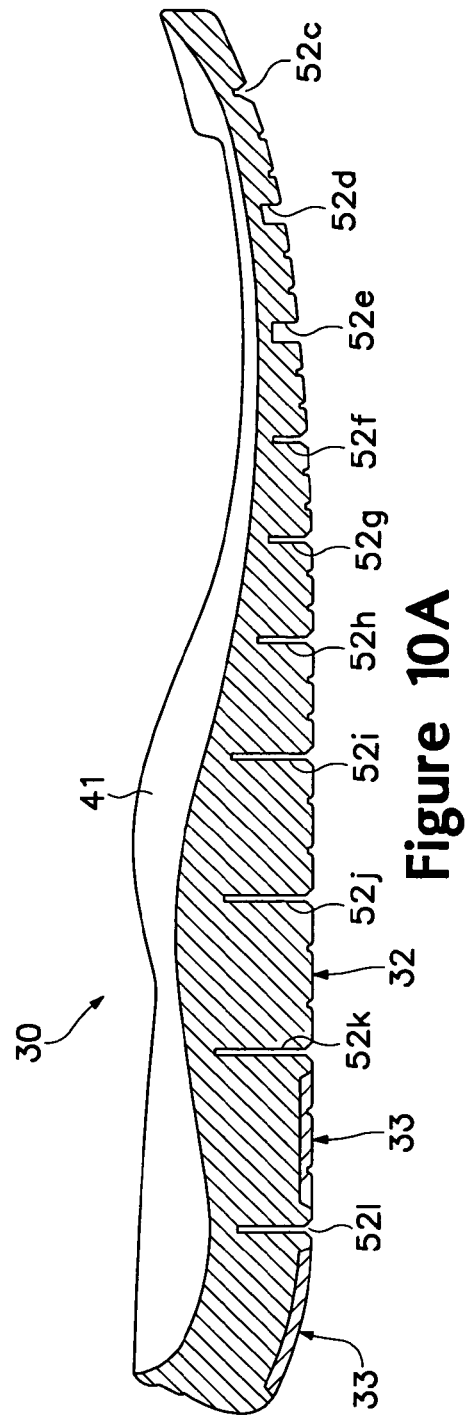

ARTICLE OF FOOTWEAR WITH A STRETCHABLE UPPER AND AN ARTICULATED SOLE STRUCTURE

CROSS-REFERENCE TO RELATED APPLICATION

This application is a continuation of and claims priority to U.S. patent application Ser. No. 11/222,508, titled "Article of Footwear with a Stretchable Upper and an Articulated Sole Structure" and filed Sep. 8, 2005 (now U.S. Pat. No. 8,303,885), which application is a continuation-in-part application of and claims priority to U.S. patent application Ser. No. 10/681,321 (now U.S. Pat. No. 6,990,755), titled "Article of Footwear with a Stretchable Upper and an Articulated Sole Structure" and filed Oct. 9, 2003. Application Ser. Nos. 11/222,508 and 10/681,321, in their entirety, are incorporated herein by reference.

BACKGROUND OF THE INVENTION

1. Field of the Invention

The present invention relates to the field of footwear. The invention concerns, more particularly, an article of footwear having a stretchable upper and a sole structure with a plurality of incisions that impart an articulated configuration with flexibility in selected directions.

2. Description of Background Art

Conventional articles of athletic footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces and absorbing energy (i.e., imparting cushioning), the sole structure may provide traction and control potentially harmful foot motion, such as over pronation. Accordingly, the upper and the sole structure operate cooperatively to provide a comfortable structure that is suited for a wide variety of ambulatory activities, such as walking and running. The general features and configuration of the upper and the sole structure are discussed in greater detail below.

The upper forms a void on the interior of the footwear for receiving the foot. The void has the general shape of the foot, and access to the void is provided by an ankle opening. Accordingly, the upper extends over the instep and toe areas of the foot, along the medial and lateral sides of the foot, and around the heel area of the foot. A lacing system is often incorporated into the upper to selectively increase the size of the ankle opening and permit the wearer to modify certain dimensions of the upper, particularly girth, to accommodate feet with varying proportions. In addition, the upper may include a tongue that extends under the lacing system to enhance the comfort of the footwear, and the upper may include a heel counter to limit movement of the heel.

Various materials may be utilized in manufacturing the upper. The upper of an article of athletic footwear, for example, may be formed from multiple material layers that include an exterior layer, a middle layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability. Accordingly, various other areas of the exterior layer of the upper may be formed from a synthetic textile. The exterior layer of the upper may be formed, therefore, from numerous material elements that each impart different properties to specific areas of the upper.

A middle layer of the upper may be formed from a lightweight polymer foam material that provides cushioning and protects the foot from objects that may contact the upper. Similarly, an interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

The sole structure generally incorporates multiple layers that are conventionally referred to as an insole, a midsole, and an outsole. The insole is a thin, cushioning member located within the upper and adjacent the plantar (lower) surface of the foot to enhance footwear comfort. The midsole, which is traditionally attached to the upper along the entire length of the upper, forms the middle layer of the sole structure and serves a variety of purposes that include controlling foot motions and providing cushioning. The outsole forms the ground-contacting element of footwear and is usually fashioned from a durable, wear-resistant material that includes texturing to improve traction.

The primary element of a conventional midsole is a resilient, polymer foam material, such as polyurethane or ethylvinylacetate, that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness, degree of ground reaction force attenuation, and energy absorption properties may be altered to meet the specific demands of the activity for which the footwear is intended to be used.

In addition to polymer foam materials, conventional midsoles may include, for example, stability devices that resist over-pronation and moderators that distribute ground reaction forces. The use of polymer foam materials in athletic footwear midsoles, while providing protection against ground reaction forces, may introduce instability that contributes to a tendency for over-pronation. Although pronation is normal, it may be a potential source of foot and leg injury, particularly if it is excessive. Stability devices are often incorporated into the polymer foam material of the midsoles to control the degree of pronation in the foot. Examples of stability devices are found in U.S. Pat. No. 4,255,877 to Bowerman; U.S. Pat. No. 4,287,675 to Norton et al.; U.S. Pat. No. 4,288,929 to Norton et al.; U.S. Pat. No. 4,354,318 to Frederick et al.; U.S. Pat. No. 4,364,188 to Turner et al.; U.S. Pat. No. 4,364,189 to Bates; and U.S. Pat. No. 5,247,742 to Kilgore et al. In addition to stability devices, conventional midsoles may include fluid-filled bladders, as disclosed in U.S. Pat. Nos. 4,183,156 and 4,219,945 to Rudy, for example.

SUMMARY OF THE INVENTION

The present invention is an article of footwear having at least one of a stretchable upper and an articulated sole structure. In one aspect of the invention, the upper includes an exterior layer and an interior layer. The exterior layer forms at least a portion of an exterior of the upper, and the exterior layer includes a plurality of incisions that extend through the exterior layer. The interior layer is located adjacent at least a portion of an inner surface of the exterior layer, and the interior layer is exposed through at least a portion of the incisions.

The incisions may include a first group and a second group. The first group may be oriented to provide stretch in a direction that extends between a medial side and a lateral side of the upper, and the second group of the incisions may be positioned adjacent the medial side and in a forefoot region of the upper.

In another aspect of the invention, the sole structure includes a connecting portion and a plurality of discrete sole elements. The connecting portion is positioned adjacent the upper and may extend along a longitudinal length of the upper. The sole elements extend downward from the connecting portion, and the sole elements are separated by a plurality of sipes that extend upward into the midsole.

The connecting portion may be configured to have a varying thickness. Accordingly, the connecting portion may exhibit a first thickness in the forefoot region of the footwear, a second thickness in a midfoot region of the footwear, and a third thickness in the heel region of the footwear, with the first and third thicknesses being less than the second thickness. In addition, the sipes may include a first sipe, a second sipe, and a plurality of third sipes. The first sipe may be oriented in the longitudinal direction and may extend through an entire length of the midsole. The second sipe may extend in the longitudinal direction and through only a portion of the length of the midsole. The third sipes may extend laterally from the medial side to the lateral side of the midsole.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 5 is a rear elevational view of the footwear.

FIG. 7 is a partial lateral elevational view of the footwear in a flexed configuration.

FIG. 9A is a first cross-sectional view of the sole structure, as defined by section line 9A-9A in FIG. 8.

FIG. 9B is a second cross-sectional view of the sole structure, as defined by section line 9B-9B in FIG. 8.

FIG. 9C is a third cross-sectional view of the sole structure, as defined by section line 9C-9C in FIG. 8.

FIG. 9G is a seventh cross-sectional view of the sole structure, as defined by section line 9G-9G in FIG. 8.

FIG. 10A is a cross-sectional view of an alternate embodiment that corresponds with the location of section line 9A-9A in FIG. 8.

DETAILED DESCRIPTION OF THE INVENTION

The following discussion and accompanying figures disclose an article of footwear 10 in accordance with the present invention. Footwear 10 is depicted in the figures and discussed below as having a configuration that is suitable for athletic activities, particularly running. The concepts disclosed with respect to footwear 10 may, however, be applied to footwear styles that are specifically designed for a wide range of other athletic activities, including basketball, baseball, football, soccer, walking, and hiking, for example, and may also be applied to various non-athletic footwear styles. Accordingly, one skilled in the relevant art will recognize that the concepts disclosed herein may be applied to a wide range of footwear styles and are not limited to the specific embodiments discussed below and depicted in the figures.

Footwear 10 is depicted in FIGS. 1-7 and includes an upper 20 and a sole structure 30. Upper 20 is formed from various material elements that are stitched or adhesively-bonded together to form an interior void that comfortably receives a foot and secures the position of the foot relative to sole structure 30. Sole structure 30 is secured to a lower portion of upper 20 and provides a durable, wear-resistant component for attenuating ground reaction forces and absorbing energy (i.e., providing cushioning) as footwear 10 impacts the ground.

Many conventional articles of footwear exhibit a configuration that controls the motion of the foot during running or other activities. A conventional sole structure, for example, may have a relatively stiff or inflexible construction that inhibits the natural motion of the foot. Upper 20 and sole structure 30 have a structure that cooperatively articulate, flex, stretch, or otherwise move to provide an individual with a sensation of natural, barefoot running That is, upper 20 and sole structure 30 are configured to complement the natural motion of the foot during running or other activities. In contrast with barefoot running, however, sole structure 30 attenuates ground reaction forces and absorbs energy to cushion the foot and decrease the overall stress upon the foot.

Figure 1:
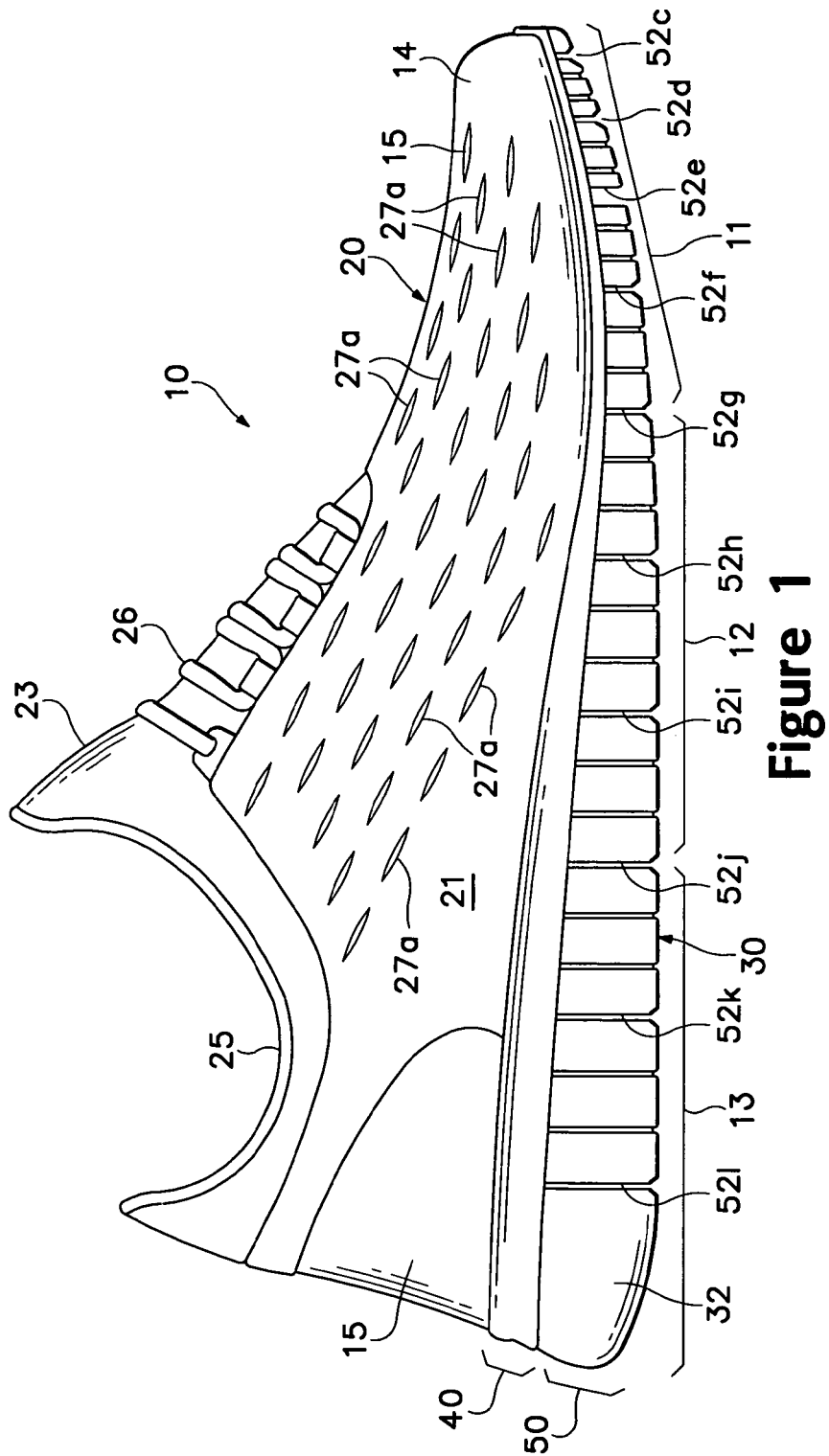
FIG. 1 is a lateral elevational view of the footwear.
Figure 2:
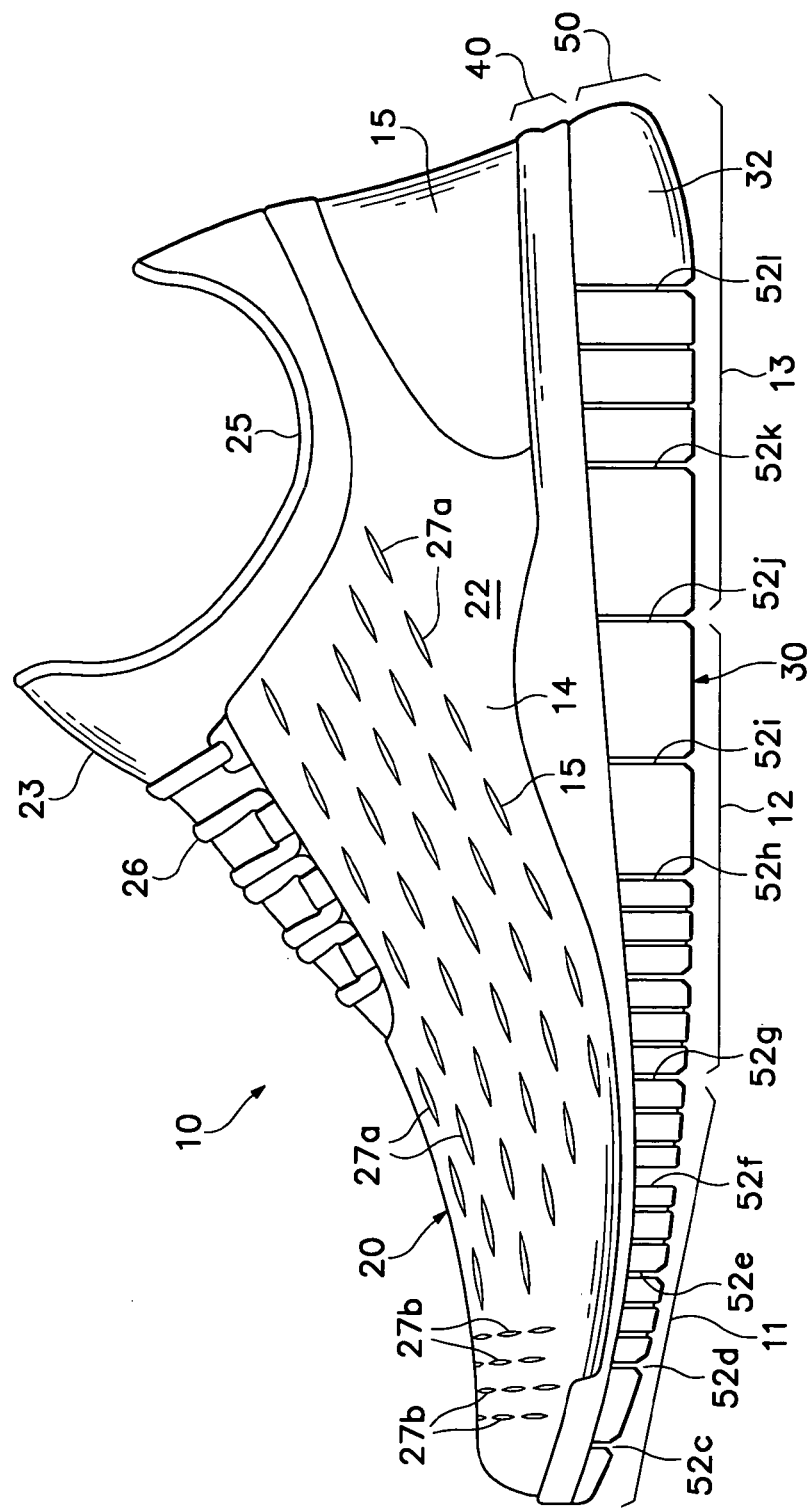
FIG. 2 is a medial elevational view of the footwear.

For purposes of reference, footwear 10 may be divided into three general regions: a forefoot region 11, a midfoot region 12, and a heel region 13, as defined in FIGS. 1 and 2. Regions 11-13 are not intended to demarcate precise areas of footwear 10. Rather, regions 11-13 are intended to represent general areas of footwear 10 that provide a frame of reference during the following discussion. Although regions 11-13 apply generally to footwear 10, references to regions 11-13 may also apply specifically to upper 20, sole structure 30, or an individual component or portion within either of upper 20 or sole structure 30.

The various material elements forming upper 20, which will be described in greater detail below, combine to provide a structure having a lateral side 21, an opposite medial side 22, a tongue 23, and a lasting sock 24 that form the void within upper 20. Lateral side 21 extends through each of regions 11-13 and is generally configured to contact and cover a lateral surface of the foot. A portion of lateral side 21 extends over an instep of the foot and overlaps a lateral side of tongue 23. Medial side 22 has a similar configuration that generally corresponds with a medial surface of the foot. A portion of medial side 22 also extends over the instep of the foot and overlaps an opposite medial side of tongue 23. In addition, lateral side 21, medial side 22, and tongue 23 cooperatively form an ankle opening 25 in heel region 13 to provide the foot with access to the void within upper 20.

Tongue 23 extends longitudinally along upper 20 and is positioned to contact the instep area of the foot. Side portions of tongue 23 are secured to an interior surface of each of lateral side 21 and medial side 22. A lace 26 extends over tongue 23 and through apertures formed in lateral side 21 and medial side 22. Tongue 23 extends under lace 26 to separate lace 26 from the instep area of the foot. By increasing the tension in lace 26, the tension in lateral side 21 and medial side 22 may be increased so as to draw lateral side 21 and medial side 22 into contact with the foot. Similarly, by decreasing the tension in lace 26, the tension in lateral side 21 and medial side 22 may be decreased so as to provide additional volume for the foot within upper 20. This general configuration provides, therefore, a mechanism for adjusting the fit of upper 20 and accommodating various foot dimensions.

Figure 4A:
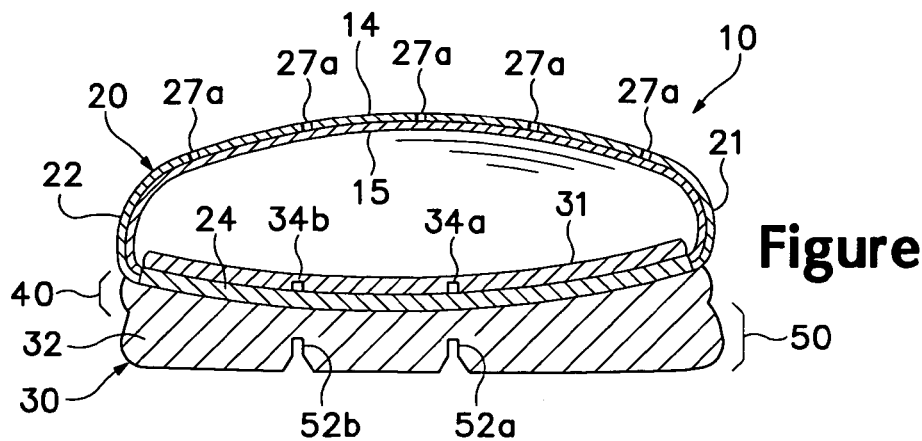
FIG. 4A is a first cross-sectional view of the footwear, as defined by section line 4A-4A in FIG. 3.
Figure 4B:
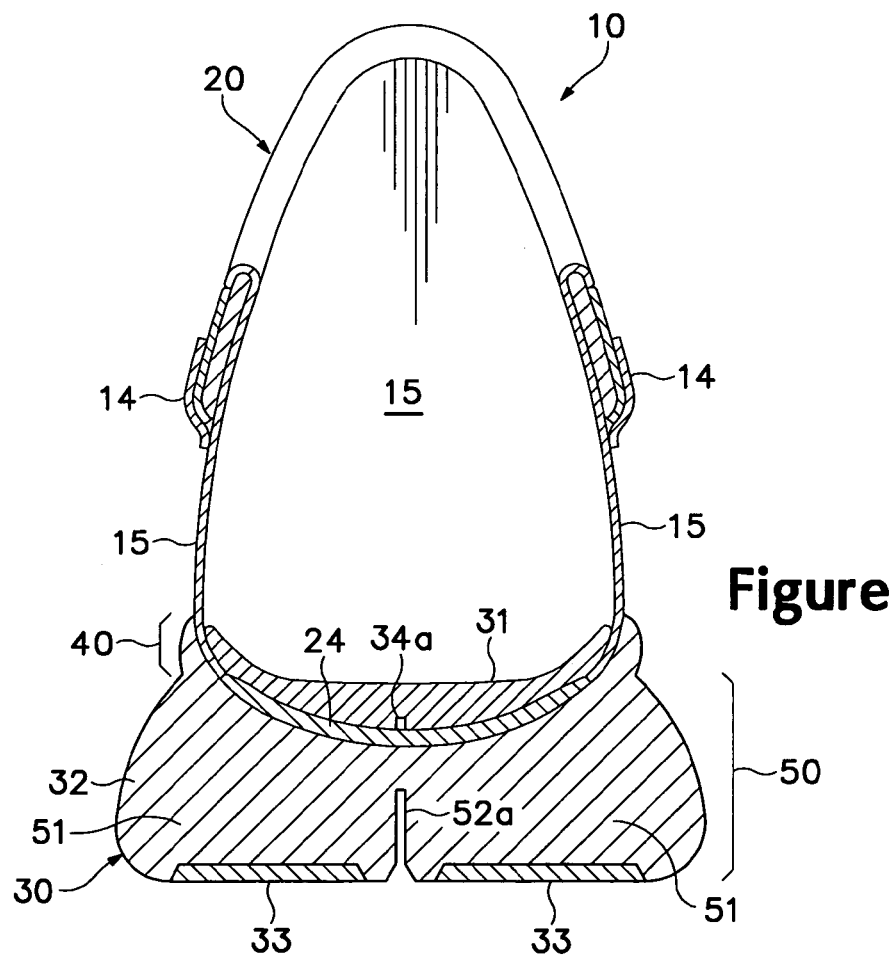
FIG. 4B is a second cross-sectional view of the footwear, as defined by section line 4B-4B in FIG. 3.

A variety of materials are suitable for upper 20, including the materials that are conventionally utilized in footwear uppers. Accordingly, upper 20 may be formed from combinations of leather, synthetic leather, natural or synthetic textiles, polymer sheets, polymer foams, mesh textiles, felts, non-woven polymers, or rubber materials, for example. The exposed portions of upper 20 are formed from two coextensive layers of material that are stitched or adhesively bonded together. As depicted in FIGS. 4A and 4B, the layers include an exterior layer 14 and an adjacent interior layer 15. Exterior layer 14 is positioned on an exterior of upper 20, and interior layer 15 is positioned on an interior of upper 20 so as to form a surface of the void within upper 20. Lasting sock 24 is secured to a lower edge of layers 14 and 15 and extends along the upper surface of sole structure 30.

The materials forming layers 14 and 15 may vary in different areas of upper 20, and only one or more of layers 14 and 15 may be present in some areas of upper 20. With respect to the areas of lateral side 21 and medial side 22 that extend through forefoot region 11 and midfoot region 12, for example, suitable materials for exterior layer 14 are various textiles, whether woven or non-woven, leather, synthetic leather, or a single layer mesh, for example, and interior layer 15 may be formed from similar materials. The materials that form tongue 23 and the area around ankle opening 25 may be different than the materials discussed above. For example, exterior layer 14 may be formed from a material that includes two spaced textile layers interconnected by a plurality of connecting fibers. One or both of the textile layers may be a mesh material to enhance the air-permeability of upper 20 in this area. In addition, a foam material may be interposed between exterior layer 14 and interior layer 15.

Whereas the areas discussed above are formed from both layers 14 and 15, a portion of upper 20 may only include a single layer. Referring to FIGS. 4B and 5, the area of upper 20 located within heel region 13 and extending around the rear portion of heel region 13 is formed solely from interior layer 15. That is, exterior layer 14 and is absent in this portion of heel region 13 such that interior layer 15 forms both the exterior and interior of upper 20. In some embodiments of the invention, however, the portion of upper 20 in heel region 13 may incorporate a conventional heel counter formed of a semi-rigid polymer material, for example, to ensure that the heel remains properly positioned with respect to upper 20. The heel counter may be located on an exterior of upper 20 or within the various material elements forming upper 20. As will be discussed below, however, the configuration of upper 20 and sole structure 30 does not necessitate the presence of a heel counter.

Based upon the above discussion, the various portions of upper 20 include different combinations of materials that form layers 14 and 15. For example, the materials forming exterior layer 14 and interior layer 15 in the areas of tongue 23 and around ankle opening 25 may be different than the materials forming exterior layer 14 and interior layer 15 in the areas of lateral side 21 and medial side 22 that extend through forefoot region 11 and midfoot region 12. As depicted in the Figures, however, the material forming interior layer 15 is the same throughout both of these areas, and the same material extends around the rearmost portion of heel region 13. Accordingly, the same material may form a substantial portion of the interior surface of upper 20. In further embodiments, however, different materials may be utilized for the various areas of interior layer 15, or upper 20 may include more than two layers of material.

Exterior layer 14 includes a plurality of incisions 27a and 27b that expose underlying portions of interior layer 15. By exposing interior layer 15, the stretch properties of upper 20 are selectively modified. In areas where no incisions 27a and 27b are present, each of layers 14 and 15 contribute to the stretch-resistance of upper 20. In areas where incisions 27a and 27b are present, however, incisions 27a and 27b permit exterior layer 14 to stretch to a greater degree. Accordingly, incisions 27a and 27b are formed in upper 20 to selectively vary the degree of stretch in specific portions of upper 20. In addition, incisions 27a and 27b may be utilized to vary the air-permeability, flexibility, and overall aesthetics (e.g., color) of upper 20.

Figure 3:
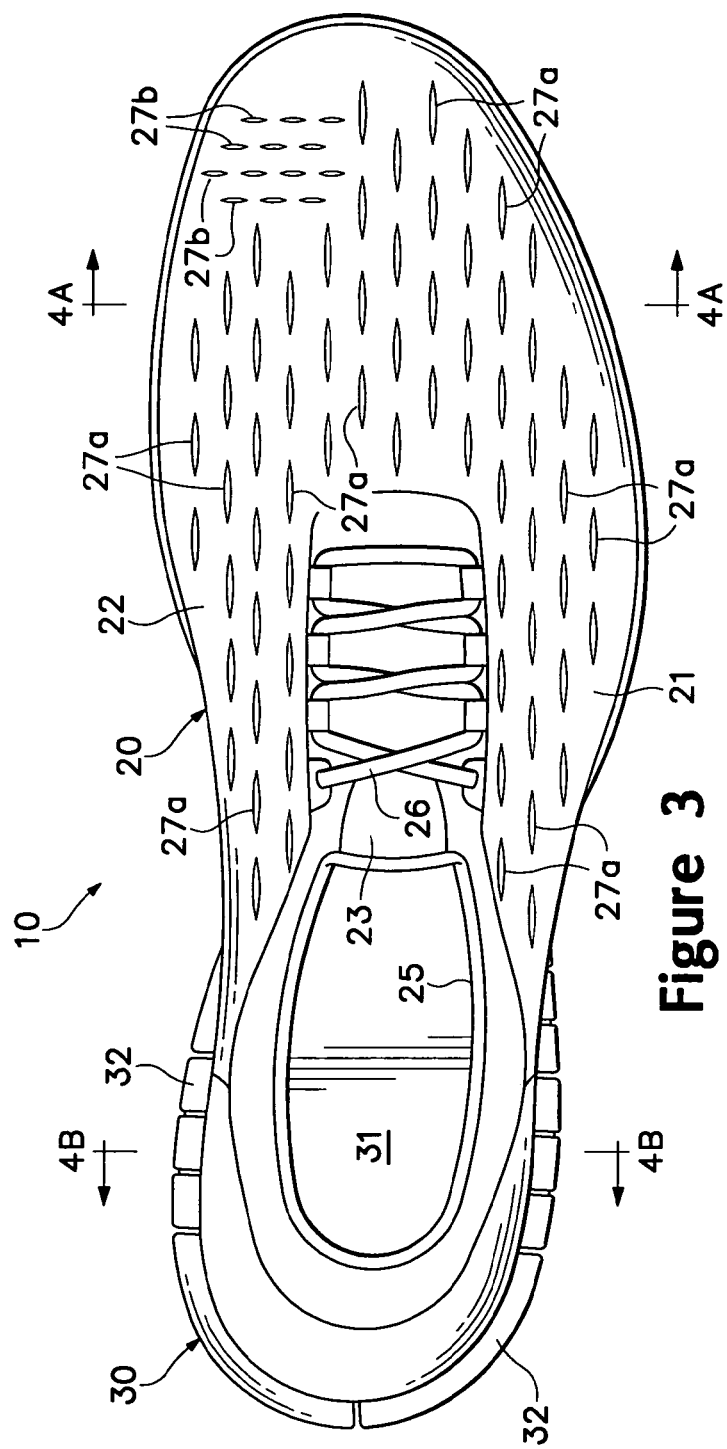
FIG. 3 is a top plan view of the footwear.

With reference to FIGS. 1-3, incisions 27a and 27b are depicted as being distributed over the areas of lateral side 21 and medial side 22 that extend through forefoot region 11 and midfoot region 12. In general, incisions 27a have a linear configuration and are oriented to extend longitudinally with respect to footwear 10. That is, incisions 27a are oriented in a direction that extends between forefoot region 11 and heel region 13. In an area of forefoot region 11 that corresponds with the hallux (i.e., the big toe), however, incisions 27b are oriented to extend laterally.

The orientation of incisions 27a and 27b has an effect upon the directions of stretch imparted by incisions 27a and 27b. In general, incisions 27a and 27b do not increase the stretch in a direction that corresponds with the linear orientation of incisions 27a and 27b. That is, a particular incision 27a and 27b does not increase the stretch in a direction that is parallel to that incision 27. Incisions 27a and 27b do, however, increase the stretch of upper 20 in a direction that is perpendicular to the linear orientation of incisions 27a and 27b.

Incisions 27a are depicted as forming lines of slits that extend longitudinally, and the incisions 27a in adjacent lines are offset from each other. Similarly, incisions 27b are depicted as forming lines of slits that extend laterally, and the incisions 27b in adjacent lines are offset from each other. The various incisions 27a and 27b, however, may be added to upper 20 in other arrangements. For example, incisions 27a and 27b may be offset so as to not form lines, or incisions 27a and 27b may be randomly placed with respect to upper 20.

Figure 6:
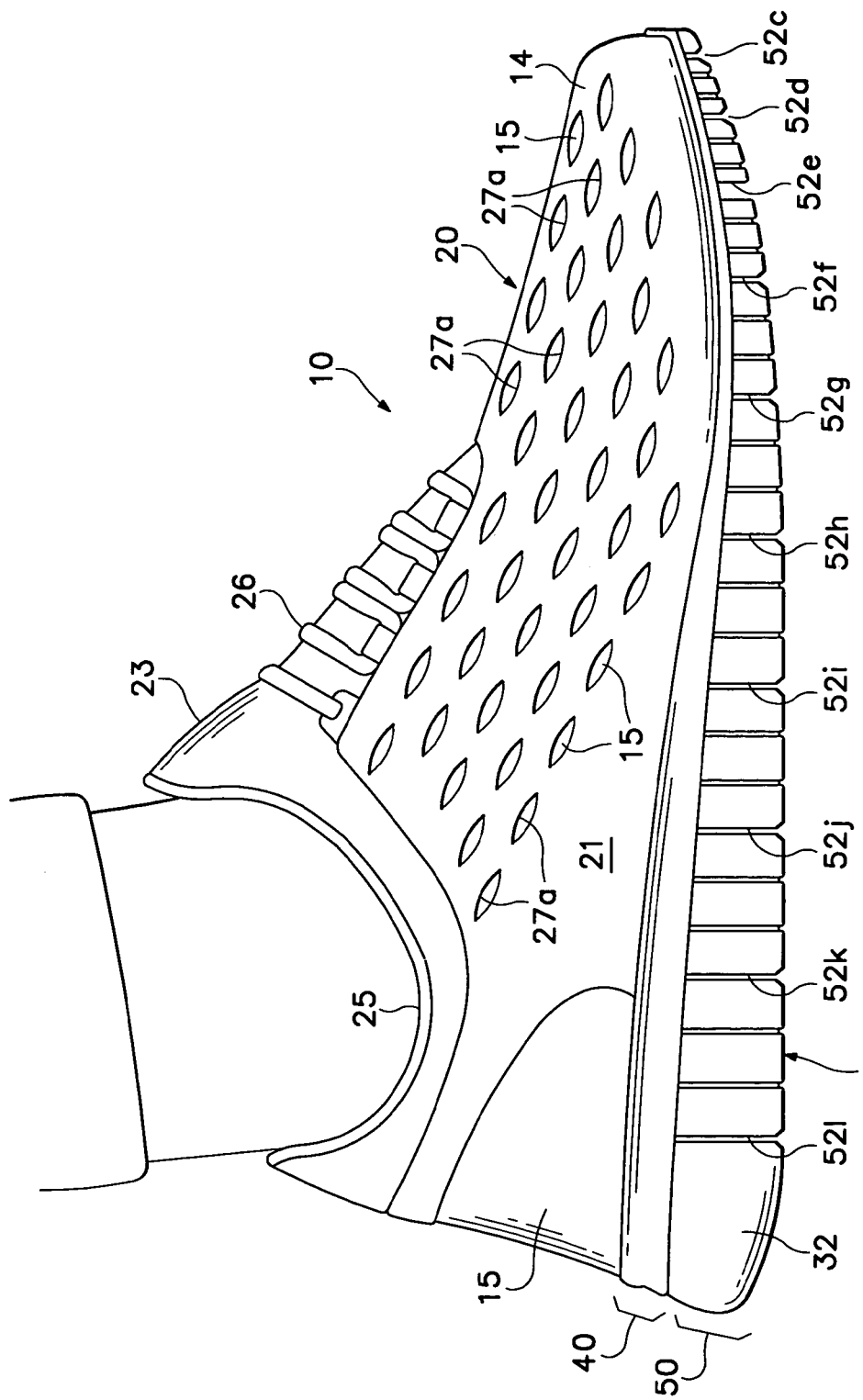
FIG. 6 is a lateral elevational view that illustrates the footwear when receiving a foot.

Incisions 27a, as discussed above, are oriented longitudinally with respect to footwear 10. When a foot is placed within upper 20, as depicted in FIG. 6, and exerts a stretching force upon upper 20, and particularly upon exterior layer 14, incisions 27a permit upper 20 to stretch in a manner that increases the girth of upper 20. That is, incisions 27a stretch in a direction that is perpendicular to the longitudinal orientation of incisions 27a. Incisions 27b stretch in a similar manner. As discussed above, however, incisions 27b are oriented laterally. Accordingly, incisions 27b stretch in the longitudinal direction.

Incisions 27a and 27b are depicted as being linear cuts in exterior layer 14. When a stretching force is exerted upon exterior layer 14 and in a direction that is generally perpendicular to one or more of incisions 27a and 27b, edges of the incisions 27a and 27b separate and form a generally elliptical shape with pointed ends, as depicted in FIG. 6. Incisions 27a and 27b are depicted as having a relatively linear and short configuration. Within the scope of the present invention, however, incisions 27a and 27b may exhibit a straight or curved configuration, for example, and the length of the various incisions 27a and 27b may be modified. Differences in the shape and length of incisions 27a and 27b may be utilized, for example, to modify the desired degree of stretch in upper 20, the air permeability of upper 20, and the flexibility and overall aesthetics of upper 20. Factors that may also be considered when determining the shape and length of incisions 27a and 27b include the materials utilized within upper 20, the degree of inherent stretch in the materials, and the directions in which stretch is desired, for example.

The materials forming a conventional upper are often stitched or otherwise sewn to each other, and an adhesive bond may be utilized to secure coextensive portions of the materials to each other. As with a conventional upper, layers 14 and 15 are arranged in a coextensive manner and may be bonded to each other. In some embodiments, however, layers 14 and 15 may be separate with no bonding. That is, layers 14 and 15 may be positioned adjacent to each other but not secured together except at edges or stress points, for example, so that interior layer 15 is unsecured to the exterior layer 14 in areas that are proximal to incisions 27a and 27b. An advantage of this configuration is that exterior layer 14 may stretch and move independent of interior layer 15. That is, incisions 27a and 27b may permit stretch in exterior layer 14 that is not significantly hindered through an adhesion between layers 14 and 15. In general, therefore, layers 14 and 15 may not be adhered or otherwise secured together in areas that include incisions 27a and 27b.

Incisions 27a and 27b are depicted as being formed in exterior layer 14. Within the scope of the present invention, however, incisions 27a and 27b may also be formed in one or both of layers 14 and 15. For example, incisions 27a and 27b may be formed in only exterior layer 14, both exterior layer 14 and interior layer 15, or in only interior layer 15. In some embodiments where both of layers 14 and 15 include incisions 27a and 27b, the incisions 27a and 27b may aligned or offset. Based upon the preceding discussion, therefore, the configuration of incisions 27a and 27b may vary considerably within the scope of the present invention.

Incisions 27a and 27b may be formed through a variety of methods. As an example, incisions 27a and 27b may be formed with a cutting instrument, such as a die, knife, or razor. In addition to cutting instruments, a laser apparatus may be employed to form incisions 27a and 27b and cut exterior layer 14 from a larger material element. Incisions 27a and 27b may be formed, therefore, by directing a laser at exterior layer 14 to remove the portions of exterior layer 14 that correspond with incisions 27a and 27b. The width of incisions 27a and 27b may approximately correspond with the width of the laser. Alternately, multiple passes of the laser may be utilized to form incisions 27a and 27b with a greater width. The laser apparatus may have the capacity to produce a laser beam of variable intensity by adjusting the power of the laser beam. In addition to adjusting the power, the focus of the laser beam and the velocity of the laser beam relative to exterior layer 14 may be varied. An example of a suitable laser apparatus is any of the conventional $CO_2$ or Nd:YAG laser apparatuses, as disclosed in U.S. Pat. Nos. 5,990,444 and 6,140,602 to Costin, which are hereby incorporated by reference.

For materials such as synthetic leather, leather, polymer sheets, and polymer textiles, which are often incorporated into footwear uppers, the power of the laser beam that forms incisions 27a and 27b is generally in a range of 0.25 to 25 watts, for example. If the laser beam has a relatively narrow focus, the power of the laser beam may be decreased to account for the greater energy per unit area in the laser beam. Similarly, if the laser beam has a relatively wide focus, the power of the laser beam may be increased to account for the lesser energy per unit area in the laser beam. Modifications to the velocity of the laser beam may also be utilized to account for the focus and power of the laser beam. Whereas materials such as leather, synthetic leather, and polymer textiles may require a relatively small power to form incisions 27a and 27b, other materials such as high-density polymers may require greater power to form incisions 27a and 27b to the same depth. Accordingly, many factors are considered in determining the proper power, focus, and/or velocity of the laser beam for forming incisions 27a and 27b.

The laser apparatus may include an emitter for the laser beam that moves adjacent to exterior layer 14 and forms incisions 27a and 27b in exterior layer 14. That is, the shape of the various incisions 27a and 27b may be controlled by movements of the laser apparatus relative to exterior layer 14. Alternately, the laser beam may reflect off of one or more movable or pivotable mirrors, and the shape of incisions 27a and 27b in exterior layer 14 may be controlled by movements of the mirrors.

The laser beam heats selected areas of exterior layer 14 and forms incisions 27a and 27b by burning or incinerating the selected areas of exterior layer 14. In order to prevent other areas of exterior layer 14 from unintentionally burning, incisions 27a and 27b may be formed in the presence of a non-combustible fluid, such as carbon dioxide or nitrogen. That is, the laser apparatus may be configured to emit a non-combustible fluid when the laser beam is forming incisions 27a and 27b.

Once incisions 27a and 27b are formed in exterior layer 14, the various elements of upper 20 are assembled around a last that imparts the general shape of a foot to the void within upper 20. That is, the various elements are assembled around the last to form lateral side 21 and medial side 22 of upper 20, which extend from forefoot region 11 to heel region 13. In addition, the instep area is formed to include tongue 23 and lace 26, for example, and ankle opening 25 is formed in heel region 13. Lasting sock 24 is also secured to lower edges of lateral side 21 and medial side 22, and lasting sock 24 extends under the last to form a lower surface of the void within upper 20. A portion of sole structure 30 is then permanently secured to a lower area of upper 20, which includes lasting sock 24. In joining upper 20 and sole structure 30, adhesives, stitching, or a combination of adhesives and stitching may be utilized. In this manner, upper 20 is secured to sole structure 30 through a substantially conventional process.

Sole structure 30 includes an insole 31 (depicted in greater detail below), a midsole 32, and an outsole 33. Insole 31 is positioned within upper 20 and adjacent to the upper surface of lasting sock 24 in order to contact the plantar (lower) surface of the foot and enhance the comfort of footwear 10. Midsole 32 is secured to a lower portion of upper 20, including lasting sock 24, and is positioned to extend under the foot during use. Among other purposes, midsole 32 attenuates ground reaction forces when walking or running, for example Suitable materials for midsole 32 are any of the conventional polymer foams that are utilized in footwear midsoles, including ethylvinylacetate and polyurethane foam. Midsole 32 may also be formed from a relatively lightweight polyurethane foam having a specific gravity of approximately 0.22, as manufactured by Bayer AG under the BAYFLEX trademark. Outsole 33 is secured to a lower surface of midsole 32 to provide wear-resistance, and outsole 33 may be recessed within midsole 32. Although outsole 33 may extend throughout the lower surface of midsole 32, outsole 33 is located within heel portion 13 in the particular embodiment depicted in the figures. Suitable materials for outsole 33 include any of the conventional rubber materials that are utilized in footwear outsoles, such as carbon black rubber compound.

A conventional footwear midsole is a unitary, polymer foam structure that extends throughout the length of the foot and may have a stiffness or inflexibility that inhibits the natural motion of the foot. In contrast with the conventional footwear midsole, midsole 32 has an articulated structure that imparts relatively high flexibility and articulation. The flexible structure of midsole 32 (in combination with the structure of upper 20) is configured to complement the natural motion of the foot during running or other activities, and may impart a feeling or sensation of barefoot running. In contrast with barefoot running, however, midsole 32 attenuates ground reaction forces and absorbs energy to cushion the foot and decrease the overall stress upon the foot.

Midsole 32 includes a connecting portion 40 and a siped portion 50. Connecting portion 40 forms an upper surface 41 and an opposite lower surface 42. Upper surface 41 is positioned adjacent to upper 20 and may be secured directly to upper 20, thereby providing support for the foot. Upper surface 41 may, therefore, be contoured to conform to the natural, anatomical shape of the foot. Accordingly, the area of upper surface 41 that is positioned in heel region 13 may have a greater elevation than the area of upper surface 41 in forefoot region 11. In addition, upper surface 41 may form an arch support area in midfoot region 12, and peripheral areas of upper surface 41 may be generally raised to provide a depression for receiving and seating the foot. In further embodiments, upper surface 41 may have a non-contoured configuration.

Figure 9D:
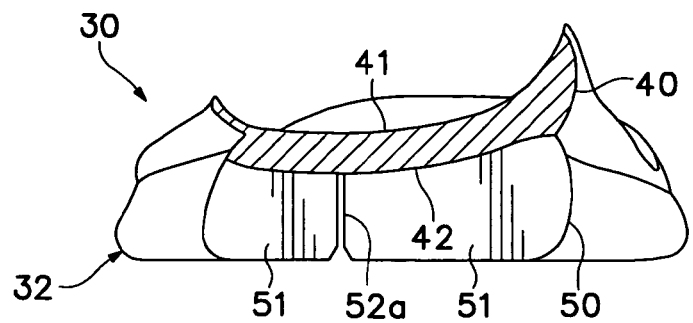
FIG. 9D is a fourth cross-sectional view of the sole structure, as defined by section line 9D-9D in FIG. 8.
Figure 9E:
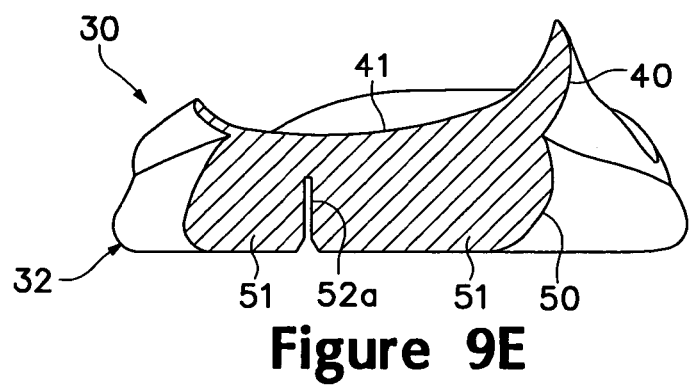
FIG. 9E is a fifth cross-sectional view of the sole structure, as defined by section line 9E-9E in FIG. 8.
Figure 9F:
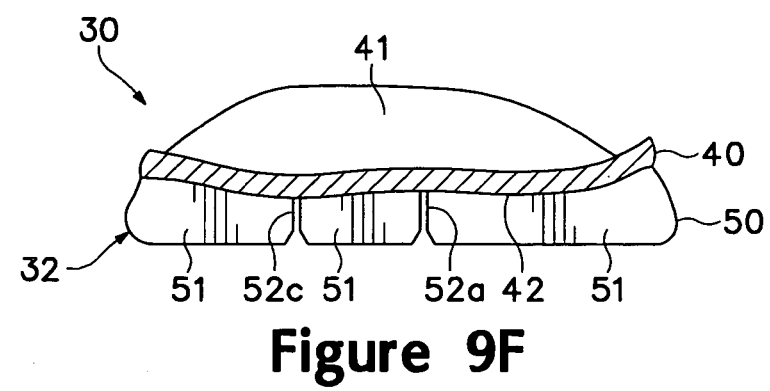
FIG. 9F is a sixth cross-sectional view of the sole structure, as defined by section line 9F-9F in FIG. 8.

The thickness of connecting portion 40, which is defined as the dimension that extends between upper surface 41 and lower surface 42, may vary along the longitudinal length of midsole 32. The thickness is depicted graphically in FIG. 9A as thickness dimensions 43a-43c. Dimension 43a, defined in forefoot region 11, may be approximately 3 millimeters and may range from 1 to 5 millimeters, for example. Dimension 43b, defined in midfoot region 12, may be approximately 8 millimeters and may range from 1 to 11 millimeters, for example. Similarly, dimension 43c, defined in heel region 13, may be approximately 6 millimeters and may range from 1 to 10 millimeters, for example. The thickness of connecting portion 40 may, therefore, increase in directions that extend from forefoot region 11 and heel region 13 toward midfoot region 12. One skilled in the relevant art will recognize, however, that a variety of thickness dimensions and variations will be suitable for connecting portion 40.

Areas of connecting portion 40 that exhibit a relatively thin thickness will, in general, possess more flexibility than areas of connecting portion 40 that exhibit a greater thickness. Variations in the thickness of connecting portion 40 may, therefore, be utilized to modify the flexibility of sole structure 30 in specific areas. For example, forefoot region 11 may be configured to have relatively high flexibility by forming connecting portion 40 with a lesser thickness. A relatively low flexibility may be imparted to midfoot region 12 by forming connecting portion 40 with a greater thickness. Similarly, an intermediate flexibility may be imparted to heel region 13 by forming connecting portion 40 with a thickness that is between the thicknesses of forefoot region 11 and midfoot region 12.

Figure 8:
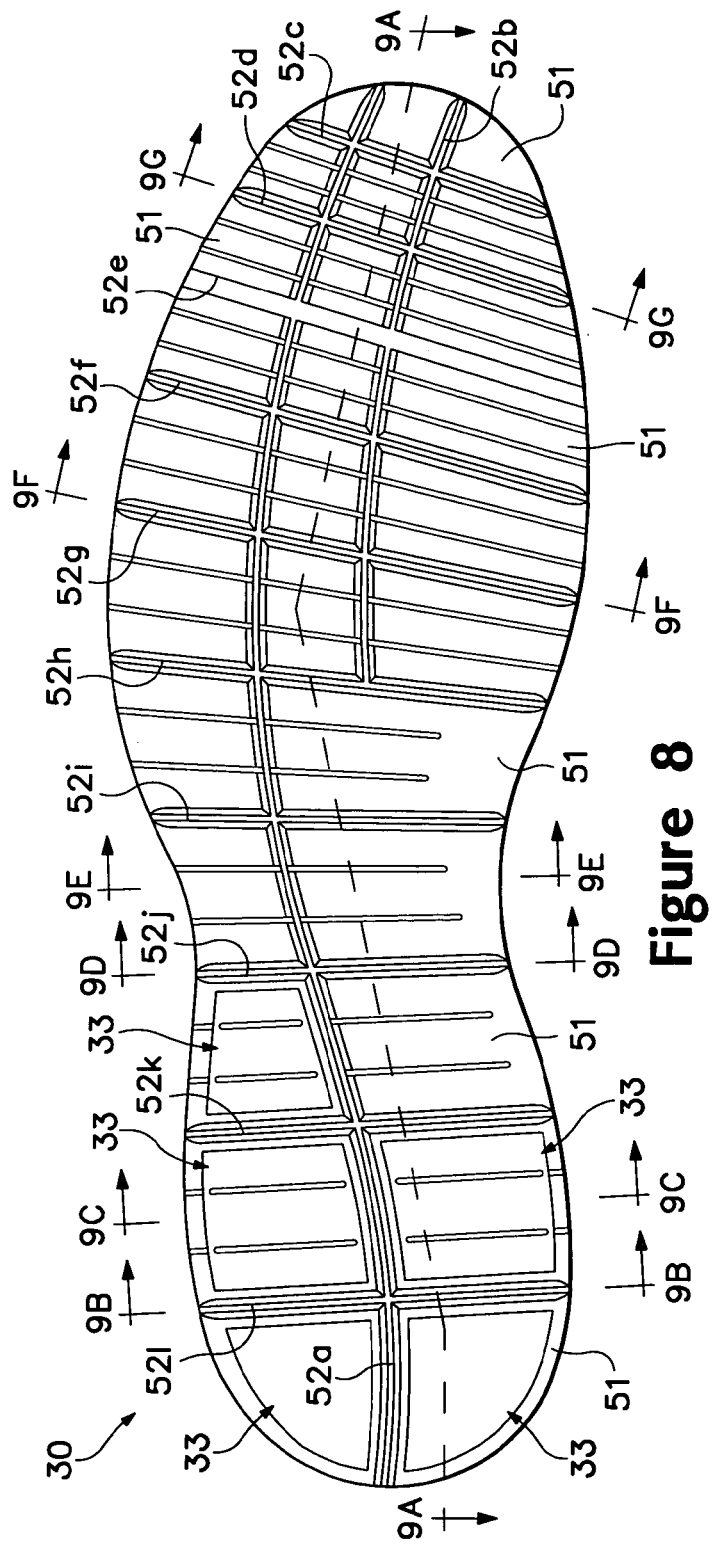
FIG. 8 is a bottom plan view of the sole structure.

Siped portion 50 forms a plurality of individual, separate sole elements 51 that are separated by a plurality of sipes 52a-52l. Sole elements 51 are discrete portions of midsole 32 that extend downward from connecting portion 40. In addition, sole elements 51 are secured to connecting portion 40 and may be formed integral with connecting portion 40. The shape of each sole element 51 is determined by the positions of the various sipes 52a-52l. As depicted in FIG. 8, sipes 52a and 52b extend in a longitudinal direction along sole structure 30, and sipes 52c-52l extend in a generally lateral direction. This positioning of sipes 52a-52l forms a majority of sole elements 51 to exhibit a generally square, rectangular, or trapezoidal shape. The rearmost sole elements 51 have a quarter-circular shape due to the curvature of sole structure 30 in heel region 13.

The thickness of siped portion 50, which is defined as the dimension that extends between lower surface 42 to a lower surface of midsole 32, may vary along the longitudinal length of midsole 32. The thickness is depicted graphically in FIG. 9A as thickness dimensions 53a and 53c. Dimension 53a, defined in forefoot region 11, may be approximately 7 millimeters and may range from 3 to 12 millimeters, for example. Similarly, dimension 53c, defined in heel region 13, may be approximately 12 millimeters and may range from 8 to 20 millimeters, for example. The thickness of siped portion 50 may, therefore, increase in a direction that extends from forefoot region 11 to heel region 13. One skilled in the relevant art will recognize, however, that a variety of thickness dimensions and variations will be suitable for siped portion 50.

The combination of dimension 43a and 53a forms the overall thickness of midsole 32 in forefoot region 11. Similarly, the combination of dimensions 43c and 53c forms the overall thickness of midsole 32 in heel region 13. Although the configuration of footwear 10 is substantially similar for footwear that is intended for males and females, experimental analysis has determined that males generally prefer a lesser overall thickness differential than females. Accordingly, footwear 10 that is designed for males may have an overall thickness in forefoot region 11 that is 10 millimeters and an overall thickness in heel region 13 that is 18 millimeters, thereby providing a differential of 8 millimeters. Footwear 10 that is designed for females, however, may have an overall thickness in forefoot region 11 that is also 10 millimeters and an overall thickness in heel region 13 that is 22 millimeters, thereby providing a differential of 12 millimeters. Footwear 10 that is designed for females may, therefore, exhibit an overall thickness differential between forefoot region 11 and heel region 13 that is greater than the thickness differential for males. The greater thickness differential may be imparted to footwear 10 by increasing the thickness of the sole elements 51 that are located in heel region 13, for example.

The shape of each sole element 51, as discussed above, is determined by the positions of the various sipes 52a-52l, which are incisions or spaces that extend upward into midsole 32 and extend between sole elements 51. Sipes 52a-52l also increase the flexibility of sole structure 30 by forming an articulated configuration in midsole 32. Whereas the conventional footwear midsole is a unitary element of polymer foam, sipes 52a-52l form flexion lines in sole structure 30 and, therefore, have an effect upon the directions of flex in midsole 32. The manner in which sole structure 30 may flex or articulate as a result of sipes 52a-52l is graphically depicted in FIG. 7.

Lateral flexibility of sole structure 30 (i.e., flexibility in a direction that extends between a lateral side and a medial side) is provided by sipes 52a and 52b. Sipe 52a extends longitudinally through all three of regions 11-13. Although sipe 52a may have a straight or linear configuration, sipe 52a is depicted as having a generally curved or s-shaped configuration. In forefoot region 11 and midfoot region 12, sipe 52a is spaced inward from the lateral side of sole structure 30, and sipe 52a is centrally-located in heel region 13. Sipe 52b, which is only located in forefoot region 11 and a portion of midfoot region 12, is centrally-located and extends in a direction that is generally parallel to sipe 52a. In general, the depth of sipes 52a and 52b increase as sipes 52a and 52b extend from forefoot region 11 to heel region 13.

Longitudinal flexibility of sole structure 30 (i.e., flexibility in a direction that extends between regions 11 and 13) is provided by sipes 52c-52l. Sipes 52c-52f are positioned in forefoot region 11, sipe 52g generally extends along the interface between forefoot region 11 and midfoot region 12, sipes 52h and 52i are positioned in midfoot region 12, sipe 52j generally extends along the interface between midfoot region 12 and heel region 13, and sipes 52k and 52l are positioned in heel region 13. Referring to FIG. 8, sipes 52i-52l are generally parallel and extend in a medial-lateral direction. Although sipes 52c-52h also have a generally parallel configuration and extend in the medial-lateral direction, sipes 52c-52h are somewhat angled with respect to sipes 52i-52l.

The positions and orientations of sipes 52a-52l are selected to complement the natural motion of the foot during the running cycle. In general, the motion of the foot during running proceeds as follows: Initially, the heel strikes the ground, followed by the ball of the foot. As the heel leaves the ground, the foot rolls forward so that the toes make contact, and finally the entire foot leaves the ground to begin another cycle. During the time that the foot is in contact with the ground, the foot typically rolls from the outside or lateral side to the inside or medial side, a process called pronation. That is, normally, the outside of the heel strikes first and the toes on the inside of the foot leave the ground last. Sipes 52c-52l ensure that the foot remains in a neutral foot-strike position and complement the neutral forward roll of the foot as it is in contact with the ground. Sipes 52a and 52b provide lateral flexibility in order to permit the foot to pronate naturally during the running cycle. Similarly, the angled configuration of sipes 52c-52h, as discussed above, provides additional flexibility that further enhances the natural, motion of the foot.

Sipe 52e has a width that is greater than the other sipes 52a-52d and 52f-52l in order to permit reverse flex in forefoot region 11. In general, sipes 52a-52l permit upward flexing of sole structure 30, as depicted in FIG. 7. In order to provide further traction at the end of the running cycle (i.e., prior to when the toes leave the ground), an individual may plantar-flex the toes or otherwise press the toes into the ground. The wider aspect to sipe 52e facilitates the plantar flexion, thereby encouraging the natural motion of the foot during running That is, sipe 52e forms a reverse flex groove in midsole 32. Experimental analysis has determined that males have a tendency to plantar-flex in the forefoot area to a lesser degree than females. In order to facilitate the greater tendency to plantar flex in females, footwear 10 that is designed for females may include a sipe 52e with an even greater width, or sipe 52d may also have additional width. Accordingly, both of sipes 52d and 52e may have increased width in footwear 10 that is designed for females, as depicted in the cross-section of FIG. 10A.

Outsole 33 includes a plurality of outsole elements that are secured to a lower surface of selected sole elements 51, and an indentation is formed in the lower surface of the selected sole elements 51 to receive the outsole elements. As depicted in the figures, outsole 33 is limited to heel region 13. In some embodiments, however, each sole element 51 may be associated with an outsole element, or outsole 33 may extend throughout the lower surface of midsole 32.

Figure 13A:
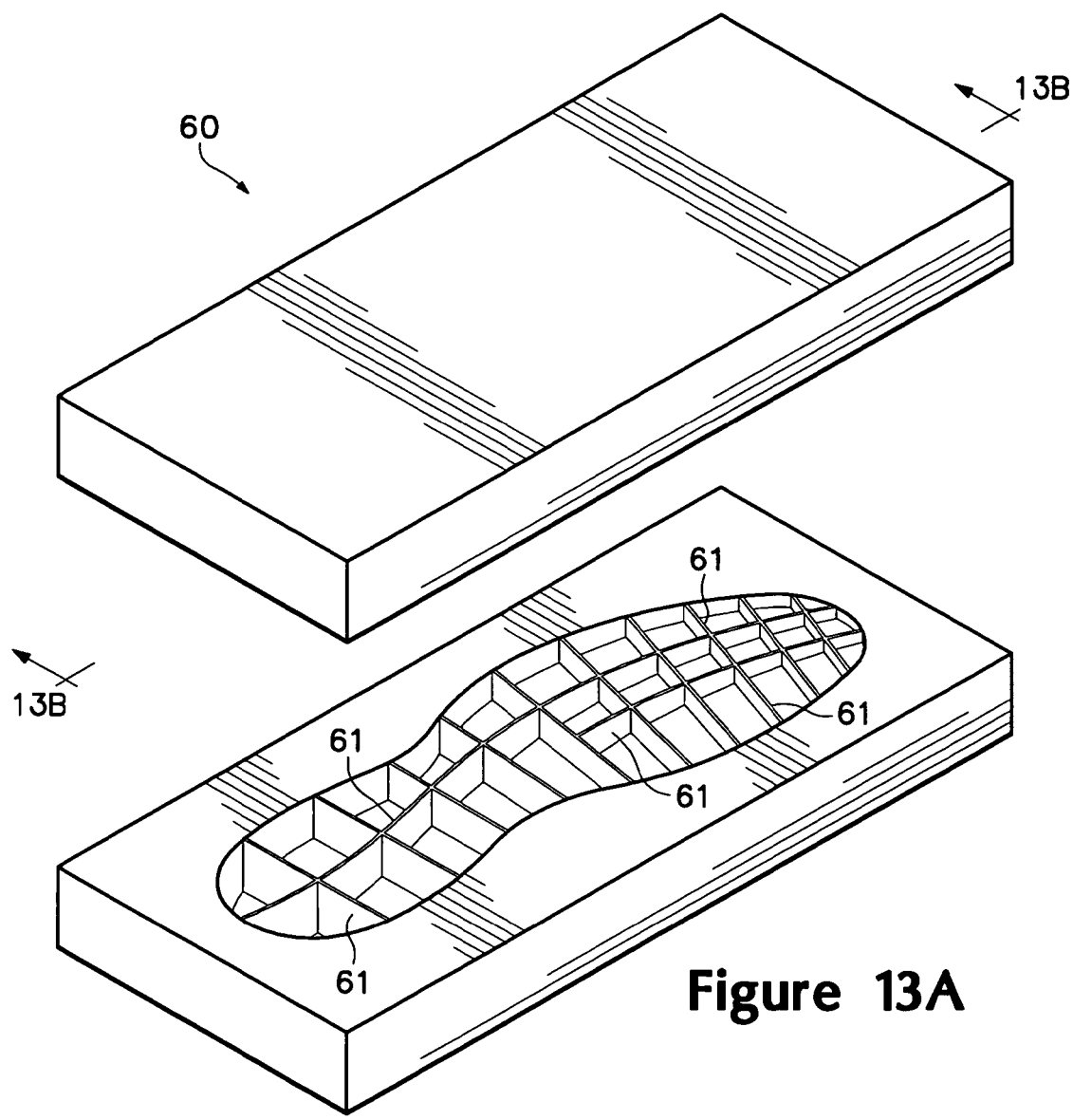
FIG. 13A is an exploded perspective view of a mold for manufacturing a midsole of the sole structure.
Figure 13B:
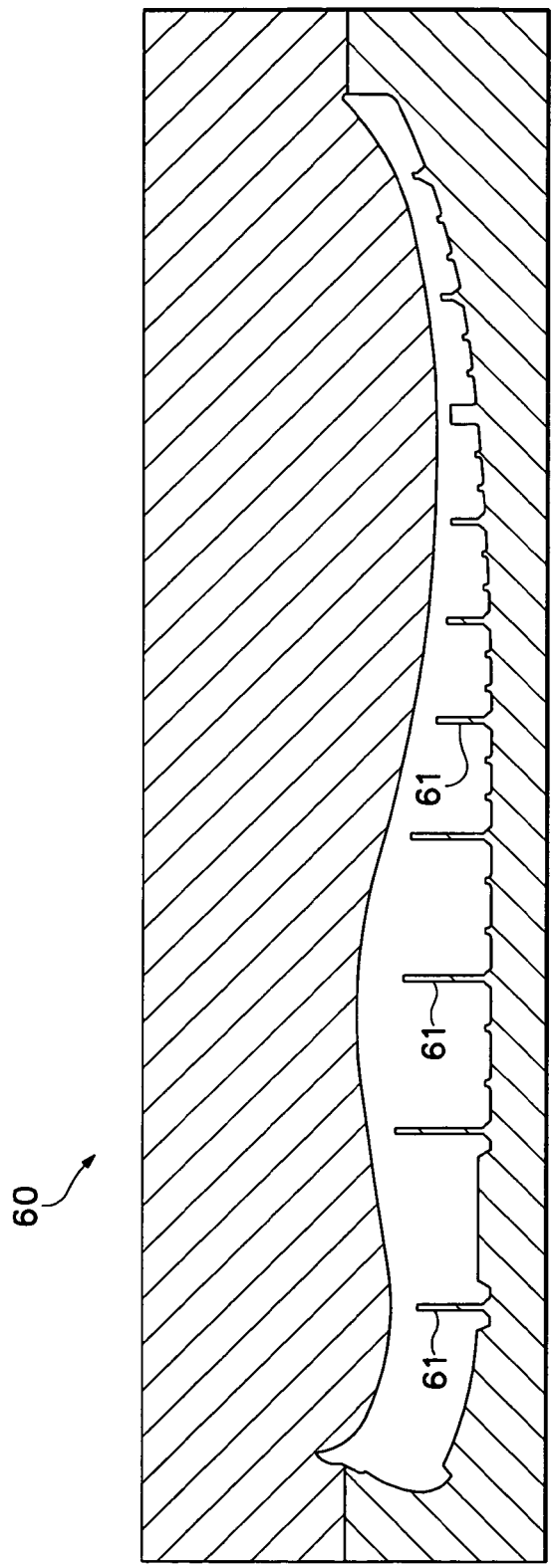
FIG. 13B is a cross-sectional view of the mold, as defined by section line 13B-13B in FIG. 13A.
Figure 13C:
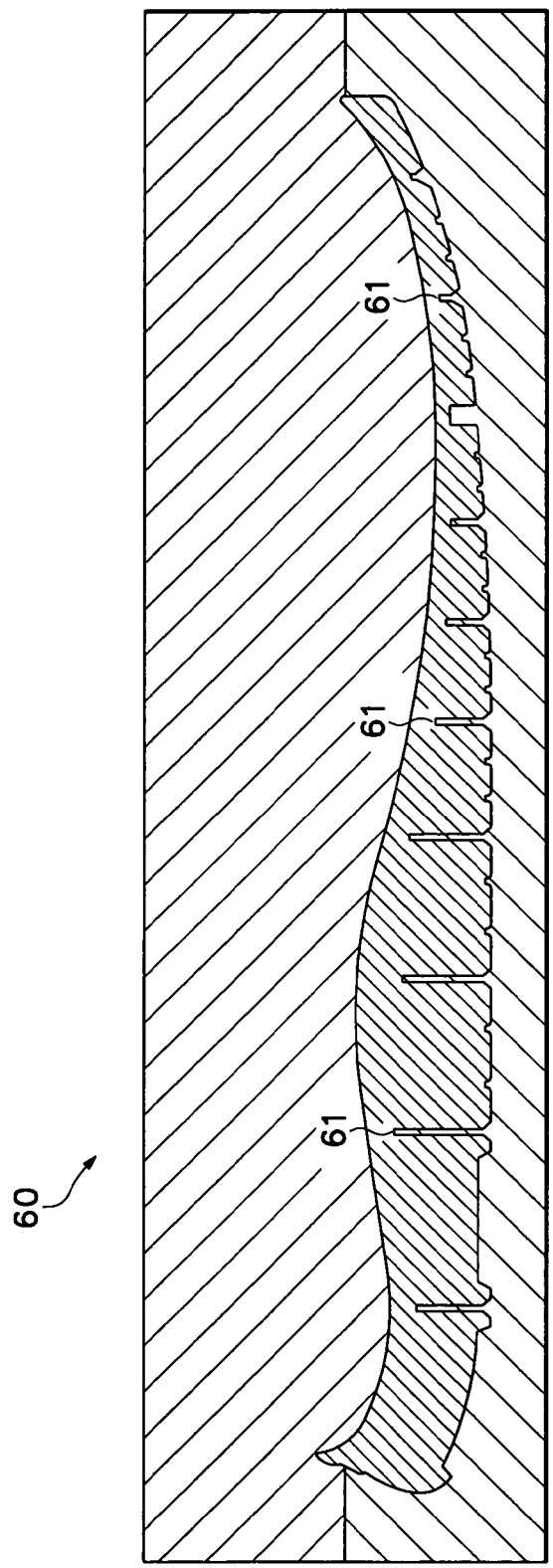
FIG. 13C is a cross-sectional view corresponding to FIG. 13B and having a polymer material in the mold.
Figure 13D:
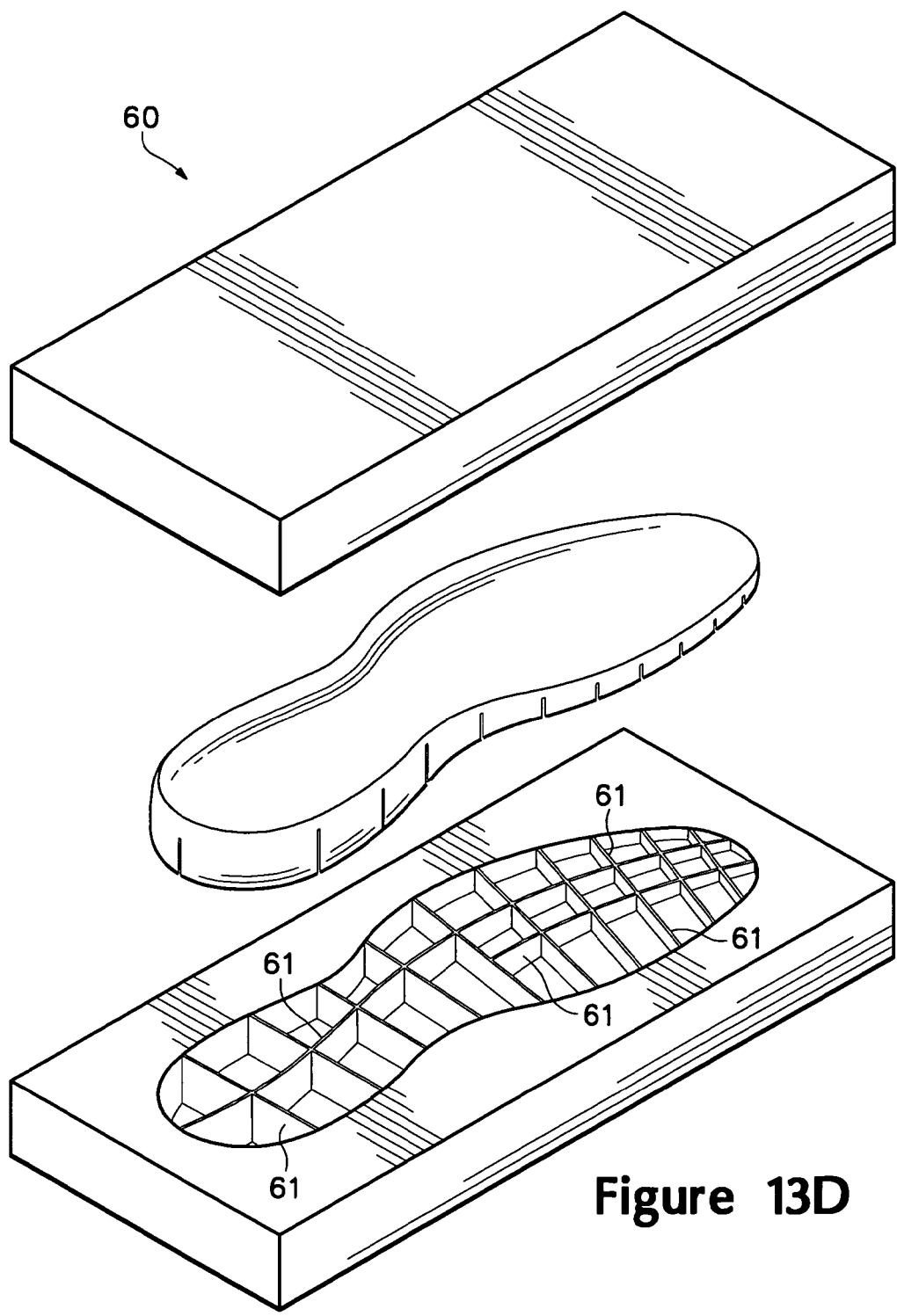
FIG. 13D is an exploded perspective view of the mold and the midsole.

A plurality of manufacturing methods are suitable for forming midsole 32. For example, midsole 32 may be formed as a unitary element, with sipes 52a-52l being subsequently formed through an incision process. Midsole 32 may also be molded such that sipes 52a-52l are formed during the molding process. Suitable molding methods for midsole 32 include injection molding, pouring, or compression molding, for example. In each of the molding methods, a blown polymer resin is placed within a mold 60 having the general shape and configuration of midsole 32, as depicted in FIGS. 13A and 13B. Mold 60 includes thin blades 61 that correspond with the positions of sipes 52a-52l. The polymer resin is placed within mold 60 and around each of blades 61, as depicted in the cross-section of FIG. 13C. Upon setting, midsole 32 is removed from the mold, as depicted in FIG. 13D, with sipes 52a-52l being formed during the molding process. The width of sipes 52a-52l may be controlled through modifications to the thickness of blades 61 within mold 60. Accordingly, the reverse flex properties of sipe 52e, for example, may be adjusted through the thickness of the blade 61 that forms sipe 52e, and the degree to which the other sipes 52a-52d and 52f-52l flex in the reverse direction may be controlled through the thickness of corresponding blades 61. A suitable width range for the blades 61 that form sipes 52a-52d and 52f-52l is 0.2-0.3 millimeters, which provides a relatively small degree of reverse flex. Similarly, a suitable width range for the portion of mold 60 (e.g., one of blades 61) that forms sipe 52e is 3-5 millimeters, for example, which provides a greater degree of reverse flex.

Upper 20 and sole structure 30 have a structure that cooperatively flex, stretch, or otherwise move to provide an individual with a sensation of natural, barefoot running That is, upper 20 and sole structure 30 are configured to complement the natural motion of the foot during running or other activities. As discussed above, exterior layer 14 includes a plurality of incisions 27a and 27b that enhance the stretch properties of upper 20 in specific areas and in specific directions. Whereas incisions 27a may be oriented to permit stretch in the girth of upper 20, for example, incisions 27b may facilitate movement of the hallux and plantar-flexion. Incisions 27a and 27b also provide a generally more flexible structure to upper 20 that complements the flexibility of sole structure 30. As discussed above, midsole 32 includes a plurality of sipes 52a-52l that enhance the flex properties of sole structure 30. The positions, orientations, and depths of sipes 52a-52l are selected to provide specific degrees of flexibility in selected areas and directions. That is, sipes 52a-52l may be utilized to provide the individual with a sensation of natural, barefoot running. In contrast with barefoot running, however, sole structure 30 attenuates ground reaction forces and absorbs energy to cushion the foot and decrease the overall stress upon the foot.

The conventional sole structure, as discussed above, may have a relatively stiff or inflexible construction that inhibits the natural motion of the foot. For example, the foot may attempt to flex during the stage of the running cycle when the heel leaves the ground. The combination of the inflexible midsole construction and a conventional heel counter operates to resist flex in the foot. In contrast, footwear 10 flexes with the foot, and may have a configuration that does not incorporate a conventional heel counter.

Figure 11:
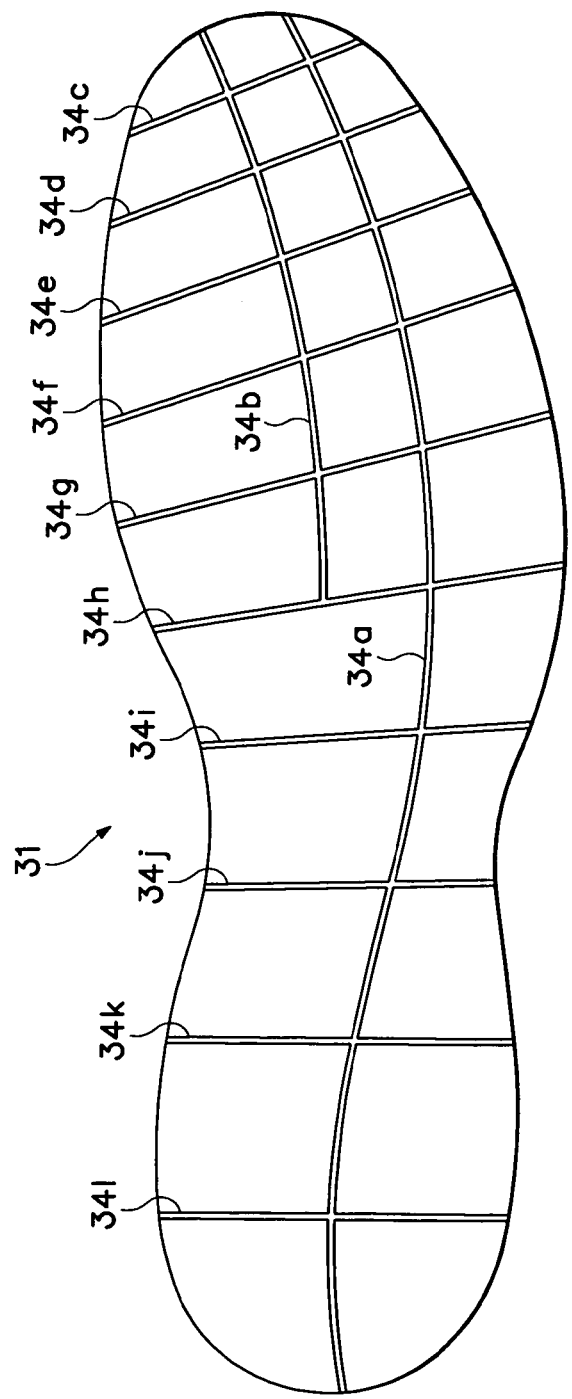
FIG. 11 is a bottom plan view of an insole portion of the footwear.
Figure 12:
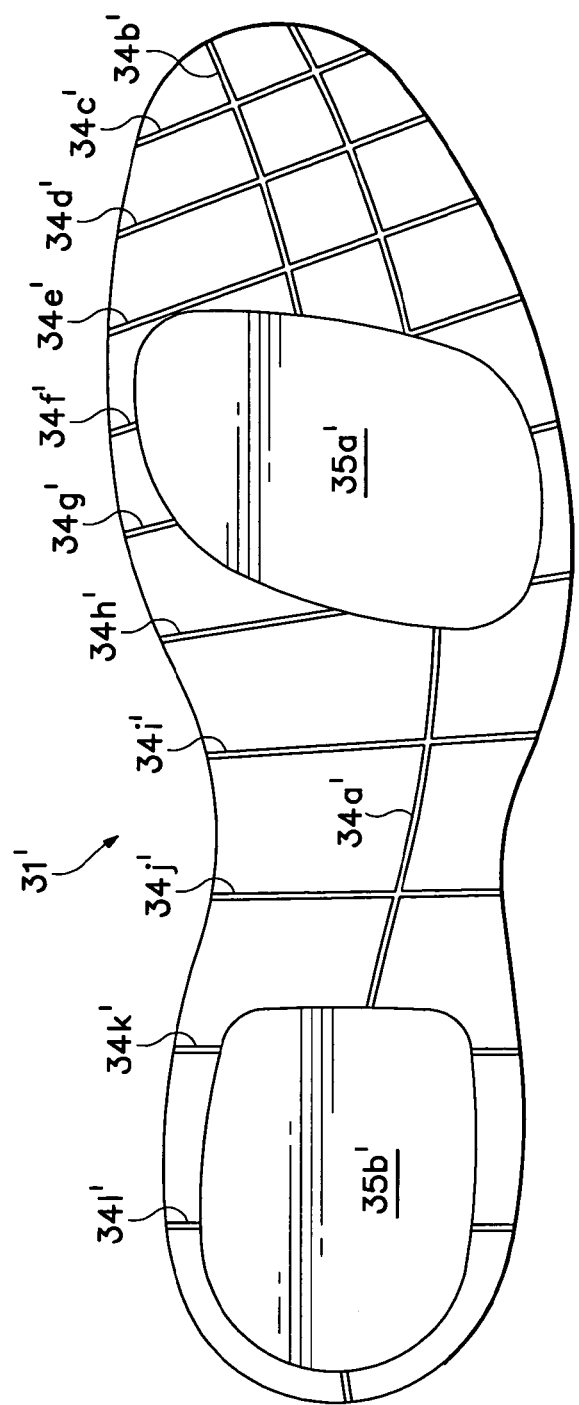
FIG. 12 is a bottom plan view of another insole portion of the footwear.

The overall flexibility of sole structure 30 may be enhanced through the configuration of insole 31. With reference to FIG. 11, a lower surface of insole 31 is depicted as having a plurality of flexion lines 34a-34l that generally correspond with the positions and configuration of sipes 52a-52l. More specifically, flexion line 34a extends longitudinally through substantially the entire length of insole 31 and generally corresponds with the position of sipe 52a. Flexion line 34b extends longitudinally through only a portion of the length of insole 31 and generally corresponds with the position of sipe 52b. Similarly, flexion lines 34c-34l extend laterally from a medial side to a lateral side of insole 31 and generally correspond with the positions of sipes 52c-52l. This configuration provides additional flexibility to sole structure 30 and enhances the articulated configuration imparted by sipes 52a-52l. A similar configuration is depicted in FIG. 12, wherein an insole 31' includes a plurality of flexion lines 34a'-34l' and two cushioning pads 35a' and 35b' formed of a compressible polymer foam.

The above discussion details the structure and configuration of footwear 10, as depicted in the figures. Various modifications may be made to footwear 10 without departing from the intended scope of the present invention. For example, incisions 27a and 27b may be formed in either of layers 14 or 15, or in both of layers 14 and 15. Incisions 27a and 27b may also be formed in different orientations or positions to provide different stretch characteristics, or a conventional heel counter may be incorporated into upper 20. With respect to sole structure 30, the thickness of connecting portion 40 or the overall thickness of midsole 32 may vary considerably. In addition, the depth, orientation, and positions of sipes 52a-52l may be modified.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. A sole structure for an article of footwear, comprising: a connecting portion; and a plurality of discrete sole elements, wherein
the connecting portion extends longitudinally along the length of the sole structure,
the discrete sole elements extend downward from the connecting portion and are separated by a first sipe, a second sipe and a plurality of third sipes extending upward into the sole structure,
the first sipe and the second sipe extend in a longitudinal direction with respect to the sole structure,
the first sipe is s-shaped and extends through forefoot, midfoot and heel regions of the sole structure and the second sipe extends through the forefoot region, is generally parallel to the first sipe, and is only located in the forefoot region and a portion of the midfoot region,
the plurality of third sipes includes forefoot region third sipes located in the forefoot region and extending from a medial edge of the sole structure to a lateral edge of the sole structure, and
a width of at least one of the forefoot third sipes is greater than a width of the other forefoot third sipes.

2. The sole structure recited in claim 1, wherein
the first sipe is positioned closer to a lateral side of the sole structure than a medial side of the sole structure in the forefoot region,
the second sipe is positioned between the first sipe and the medial side,
the plurality of third sipes includes heel region third sipes located in a heel region and extending from the lateral side to the medial side, each of the heel region third sipes intersecting the first sipe in the heel region.

3. The sole structure recited in claim 2, wherein the forefoot region third sipes are angled with respect to the heel region third sipes.

4. The sole structure recited in claim 2, wherein the plurality of third sipes is ten sipes.

5. The sole structure recited in claim 1, wherein a depth of the first sipe increases as the first sipe extends from the forefoot region toward a heel region of the sole structure.

6. The sole structure recited in claim 1, wherein the second sipe is approximately centered between a lateral side of the sole structure and a medial side of the sole structure.

7. The sole structure recited in claim 1, wherein the first sipe is approximately centered between a lateral side of the sole structure and a medial side of the sole structure in a heel region of the sole structure.

8. The sole structure recited in claim 1, comprising an outsole element secured to a lower surface of the sole structure.

9. The sole structure recited in claim 1, comprising a plurality of outsole elements secured to a lower surface of the sole structure, each of the outsole elements secured to a discrete sole element.

10. The sole structure recited in claim 9, wherein at least two of the outsole elements of the plurality are secured to discrete sole elements in a heel region of the sole structure.

11. The sole structure recited in claim 1, wherein the sipes are substantially perpendicular to a lower surface of the sole structure.

12. The sole structure recited in claim 1, further comprising an upper secured to the sole structure.

* * * * *